United States Patent
Chung et al.

(10) Patent No.: US 6,421,386 B1
(45) Date of Patent: Jul. 16, 2002

(54) METHOD FOR CODING DIGITAL MOVING VIDEO INCLUDING GRAY SCALE SHAPE INFORMATION

(75) Inventors: Jae Won Chung; Ji Heon Kweon; Joo Hee Moon, all of Seoul (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/473,966

(22) Filed: Dec. 29, 1999

(51) Int. Cl.$^7$ ................................................. H04B 1/66
(52) U.S. Cl. ................................................. 375/240.24
(58) Field of Search .................. 375/240, 240.01, 375/240.02, 240.03, 240.08, 240.09, 240.1, 240.11, 240.12, 240.13, 240.15, 240.16, 240.17, 243; 382/232, 243, 239; 348/404.1, 407.1, 409.1, 699, 700; H04B 1/66

(56) References Cited

U.S. PATENT DOCUMENTS

| | | | |
|---|---|---|---|
| 5,748,789 A | * 5/1998 | Lee et al. | 382/243 |
| 6,151,413 A | * 11/2000 | Jang | 382/243 |
| 6,208,693 B1 | * 3/2001 | Chen et al. | 375/240.24 |
| 6,246,796 B1 | * 6/2001 | Horikoshi et al. | 382/232 |
| 6,256,345 B1 | * 7/2001 | Cho | 375/240.08 |
| 6,310,916 B1 | * 10/2001 | Han | 375/240.11 |

OTHER PUBLICATIONS

Chun et al., A perceptually Tuned Subband Image Coder Based on the Measure of Just–Noticeable–Distortion Profile, vol., 5, No. 6, Dec. 1995, pp. 467–476.*

M. D. Swanson et al., Object– Based Transparent Video Watermarking, IEEE 1997, pp. 369–374.*

David E. Been et al., A Level– Set Approach for the Metamorhosis of Solid Models, vol. 7, No. 2, Apr.– Jun. 20, 2001, pp. 173–192.*

* cited by examiner

*Primary Examiner*—Chris Kelley
*Assistant Examiner*—Tung Vo
(74) *Attorney, Agent, or Firm*—Jacobson Holman, PLLC

(57) ABSTRACT

A method for coding a digital moving video including gray scale shape information. Picture-unit overhead information is first transmitted and it is then determined whether a video packet to be coded is a first packet of a given picture. A video packet header including overhead information for the decoding of the gray scale shape information is transmitted if the video packet is not the first packet of the given picture. Then, it is determined whether the given picture is an intra picture. If the given picture is the intra picture, the video packet is coded and transmitted in an intra picture mode. If the given picture is not the intra picture, the video packet is coded and transmitted in an inter picture mode. If the video packet is not a last packet of the given picture, a digital moving video coding operation is performed repeatedly. The digital moving video coding operation is ended if the video packet is the last packet of the given picture. Even when the coded video packet is transmitted through a channel where a transmission error may often occur, such as a mobile communication channel, a decoder can perform an error concealment operation of high performance to reconstruct a moving picture of high quality.

12 Claims, 16 Drawing Sheets

FIG. 3

| TMB | BMB | BMB | BMB | BMB | BMB | BMB | TMB |
|-----|-----|-----|-----|-----|-----|-----|-----|
| BMB | BMB | OMB | OMB | OMB | OMB | BMB | BMB |
| BMB | OMB | OMB | OMB | OMB | OMB | OMB | BMB |
| BMB | BMB | BMB | OMB | OMB | BMB | BMB | BMB |
| TMB | TMB | BMB | BMB | BMB | BMB | TMB | TMB |

FIG. 7(a)

| 100 | 100 | 100 | 100 |
|-----|-----|-----|-----|
| 100 | 100 | 100 | 100 |
| 100 | 100 | 100 | 100 |
| 100 | 100 | 100 | 100 |

FIG. 7(b)

| X | 200 | 180 | 150 |
|---|-----|-----|-----|
| X | 180 | 110 | 130 |
| X | X   | 200 | 170 |
| X | X   | X   | 180 |

FIG. 8(a)

| 0 | 255 | 255 | 255 |
|---|-----|-----|-----|
| 0 | 255 | 255 | 255 |
| 0 | 0   | 255 | 255 |
| 0 | 0   | 0   | 255 |

FIG. 8(b)

| 100 | 200 | 180 | 150 |
|-----|-----|-----|-----|
| 100 | 180 | 110 | 130 |
| 100 | 100 | 200 | 170 |
| 100 | 100 | 100 | 180 |

FIG. 9(a)

| 0 | 128 | 255 | 128 |
|---|---|---|---|
| 0 | 128 | 255 | 255 |
| 0 | 0 | 128 | 255 |
| 0 | 0 | 0 | 128 |

FIG. 9(b)

| 100 | 150 | 180 | 125 |
|---|---|---|---|
| 100 | 140 | 110 | 130 |
| 100 | 100 | 150 | 170 |
| 100 | 100 | 100 | 140 |

FIG. 10(a)

| 0 | 255 | 255 | 255 |
|---|---|---|---|
| 0 | 255 | 255 | 255 |
| 0 | 0 | 255 | 255 |
| 0 | 0 | 0 | 255 |

FIG. 10(b)

| X | 128 | 255 | 128 |
|---|---|---|---|
| X | 128 | 255 | 255 |
| X | X | 128 | 255 |
| X | X | X | 128 |

FIG. 11

VIDEO PACKET

| Resync marker | Macroblock number | Quant scale | HEC | Macroblock Data | Resync marker |
|---|---|---|---|---|---|

FIG. 12

VIDEO PACKET

| Resync marker | Macroblock number | Quant scale | HEC | Motion & overhead Information | Motion marker | Texture Information | Resync marker |
|---|---|---|---|---|---|---|---|

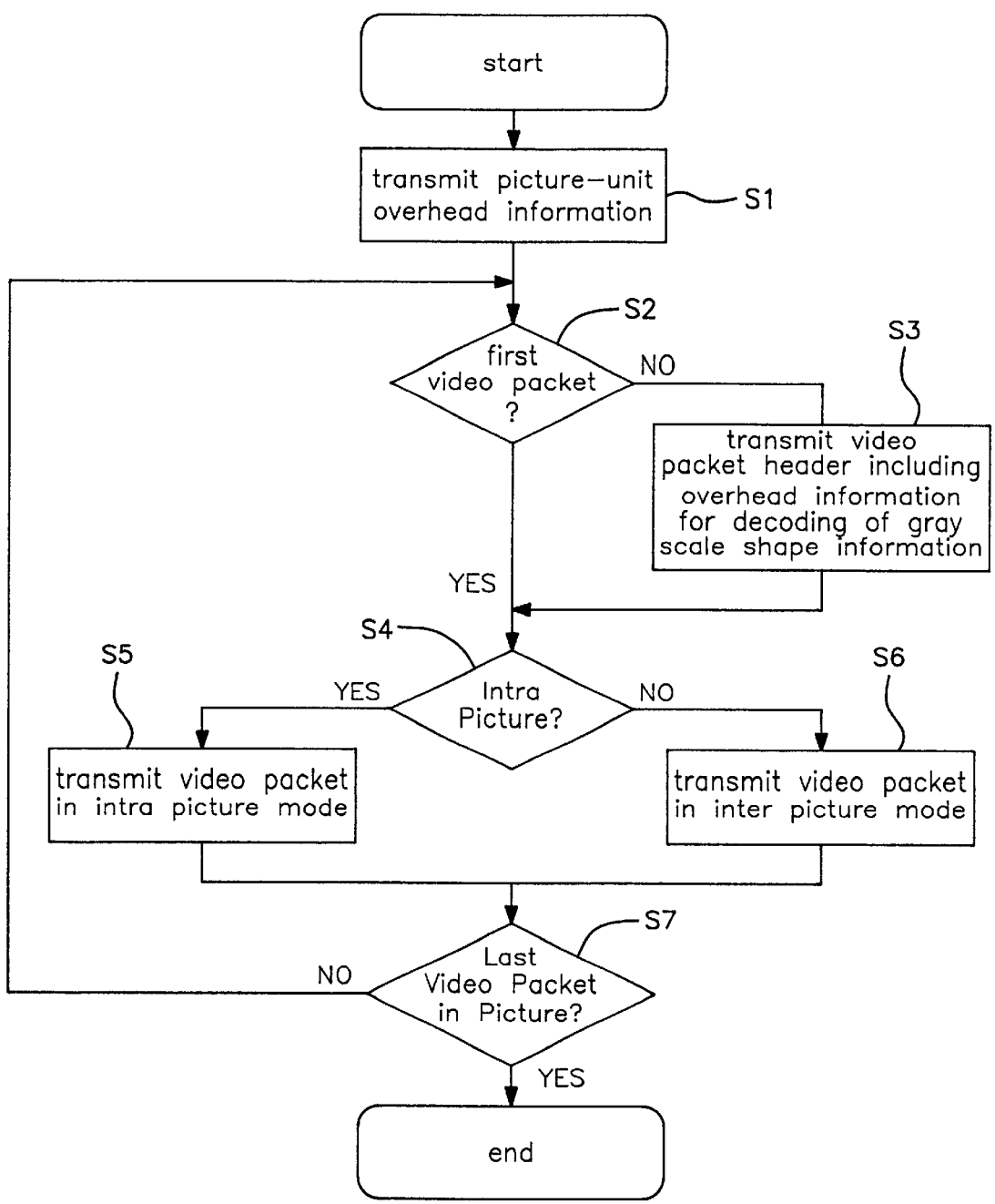

METHOD FOR CODING DIGITAL MOVING VIDEO INCLUDING GRAY SCALE SHAPE INFORMATION

BACKGROUND OF THE INVENTION

1. Field of the Invention

The present invention relates in general to the coding and decoding of a digital moving image or video including gray scale shape information, and more particularly to a method for coding and decoding a digital moving video including gray scale shape information, in which the gray scale shape information is compression-coded and transmitted with a degradation in picture quality resulting from a transmission error or channel error being minimized.

2. Description of the Prior Art

Generally, video signal compression-coding and decoding methods are capable of transmitting video information through a low-rate channel and reducing the capacity of a memory required to store the video information. In this connection, the video signal compression-coding and decoding methods are very important techniques for the multimedia industry necessitating applications such as video storage and transmission. The present invention relates to a method for coding and decoding a digital moving video including gray scale shape information, which is applicable to such video signal compression-coding and decoding techniques.

In digital moving video coders, there is widely used a method wherein frames of a digital moving video are defined and used as three types, or I, P and B types for high-efficiency video compression and random access. Here, information for distinguishing the I, P and B frames from one another is defined as a "picture coding type". Features of these three types of frames will hereinafter be described with reference to FIG. 1, which shows an example of picture coding types and the associated predictive directions. In FIG. 1, reference directions of P frames are indicated by the upper arrows and reference directions of B frames are indicated by the lower arrows. In this example, an interval between adjacent I frames and the number of consecutive B frames may be varied according to applications or equipment.

Firstly, the coding of I frames (intra coded frames) does not refer to other frames.

Secondly, the motion compensated prediction and coding of P frames (predictive coded frames) are performed with reference to a previous I frame or a previous P frame. As a result, the coding is possible at a high compression ratio. In this case, the referred I frame or P frame is defined as a "reference frame". Between successive frames of a video, there is a high redundancy of texture information on a time axis. For this reason, a method of estimating motion information between a previous reference frame and a current P frame, performing motion compensated prediction using the estimated motion information and coding and transmitting a prediction error and the motion information is more advantageous in view of a compression rate than a method of performing the coding with no reference, like the I frame coding.

Thirdly, B frames (bidirectionally-predictive coded frames) are highest in compression rate. The prediction of the B frames is performed with reference to a next frame as well as a previous frame. The B frames are highest in compression rate because two reference frames are used and a more excellent one of prediction performances thereof is selected. On the other hand, the B frames do not become reference frames for other frames. In this connection, a previous frame of a current B frame is a previous I frame or P frame nearest to the current B frame in display order. Also, a next frame of the current B frame is a next I frame or P frame nearest to the current B frame in display order.

Provided that all the I, P and B frames are used for the compression-coding of a digital moving video, a digital order and coding order thereof will be different. For example, as shown in FIG. 1, the I, P and B frames are coded in order of I1, P1, B1, P2, B2, P3, B3, I2 and B4, whereas they are displayed in order of I1, B1, P1, B2, P2, B3, P3, B4 and I2. The second frame, B1, in the display order can be decoded and displayed in a receiver after the third frame, P1, in the display order is decoded in the receiver. In this regard, low-delay coding is required for an application with a real-time video communication function, such as a videophone. In such an application, a digital moving video is compression-coded and transmitted on the basis of only the I and P frames with no B frame.

For the compression-coding of a digital moving video, the motion estimation and compensation and the texture information coding are performed on the basis of a pixel group unit with a predetermined size, which is defined as a "macroblock (MB)". The most widely used size of the macroblock is generally 16 pixels/line×16 lines (referred to hereinafter as 16×16).

Macroblock-unit coding methods may generally be classified into two types, or an "intra(frame) coding" method and an "inter(frame) coding" method. The intra coding method is adapted to code input texture information included in a macroblock, and the inter coding method is adapted to predict texture information from a reference frame and code a difference between the predicted texture information and input texture information, or a prediction error. Because the coding of an I frame is performed without referring to other frames, the intra coding method is performed with respect to all macroblocks in the I frame. But, the inter coding method as well as the intra coding method are possible with respect to a P frame. As a result, any one of either the inter coding method or intra coding method is selected for a higher coding efficiency. For example, in the case where the motion estimation is erroneously performed, the prediction error may become larger. In this case, coding the larger prediction error may be lower in coding efficiency than coding the input texture information. Hence, in this case, the intra coding method is more advantageous than the inter coding method. This signifies that some macroblocks for the intra coding may be present in the P frame.

In brief, the intra coding method and inter coding method are selectively performed according to whether signal to be coded is an input texture signal or a prediction error signal. Macroblocks for the intra coding and inter coding are together present in the P frame, whereas only macroblocks for the intra coding are present in the I frame.

Hereinafter, the macroblocks for the intra coding will be referred to as "intra macroblocks" and the macroblocks for the inter coding will be referred to as "inter macroblocks". Also, information for distinguishing the intra and inter macroblocks from each other will be defined as a "macroblock type".

On the other hand, moving video coding methods may generally be classified into a frame-based coding method which codes a rectangular frame and an object-based coding method which codes only an arbitrarily-shaped region. The object-based coding method is adapted to code and transmit only an object region to be coded, whereas the frame-based coding method is adapted to code and transmit all pixels in the frame. Because the object-based coding method is advantageous in that the user can code and transmit or manipulate only a desired object, it is anticipated to play an important part for the whole of future multimedia industry.

The representative examples of the framed-based coding method are shown in the H.261 and H.263 standards prescribed in International Telecommunication Union-Telecommunication Standardization Sector (ITU-T, the successor of CCITT) and the Moving Picture Experts Group Phase 1 (MPEG-1) and MPEG-2 standards prescribed in International Standardization Organization/International Electrotechnical Commission Joint Technical Committee 1/Sub Committee 29/Working Group 11 (ISO/IEC JTC1/SC29/WG11). The representative examples of the object-based coding method are shown in the MPEG-4 standard prescribed in ISO/IEC JTC1/SC29/WG11.

With reference to FIG. 2, there is a block diagram of an MPEG-4 moving video encoder established by the above international standardization organization. In the MPEG-4 standard, the term "video object plane (VOP)" is used instead of the term "frame". In the encoder, upon receiving information (texture information and shape information) regarding a desired object, a motion estimation part 13 estimates macroblock-unit motion from the received information. A motion compensation part 14 performs a motion compensated prediction operation for the input texture information on the basis of motion information from the motion estimation part 13. A subtracter 16 detects a difference between the input texture information and motion compensated prediction texture information from the motion compensation part 14. A texture coding part 18 codes the texture information of the input object according to the difference detected by the subtracter 16.

An adder 17 adds the motion compensated prediction texture information from the motion compensation part 14 to the texture information coded by the texture coding part 18 and outputs the added result as a previous reconstructed VOP to a previous reconstructed VOP memory 15. The previous reconstructed VOP memory 15 stores the previous reconstructed VOP from the adder 17 for use in the coding of the next input object. That is, the previous reconstructed VOP stored in the previous reconstructed VOP memory 15 is applied to the motion estimation part 13 and motion compensation part 14 to be used for the motion estimation and motion compensation.

The MPEG-4 moving video encoder performs the intra coding and inter coding on the basis of the macroblock unit, too. To this end, although not shown in FIG. 2, the MPEG-4 moving video encoder comprises a part for determining a macroblock coding type. If the determined macroblock coding type is an intra macroblock type, the motion compensation operation is not performed, thereby allowing the input texture information to be applied directly to the texture coding part 18. Also, the texture information coded by the texture coding part 18 is applied directly to the previous reconstructed VOP memory 15, not via the adder 17.

The shape information inputted together with the texture information is coded by a shape coding part 12, which then outputs a shape information bitstream and reconstructed shape information. As indicated by dotted lines in FIG. 2, the reconstructed shape information from the shape coding part 12 is applied to the motion estimation part 13, motion compensation part 14 and texture coding part 18 so that it can be used for the object-based motion estimation, the object-based motion compensation and the object-based coding of the texture information of the input object in the unit of the arbitrarily-shaped object. The MPEG-4 moving video encoder is able to perform the frame-based coding as well as the object-based coding. The coding and transmission of shape information are not required in the frame-based coding. To this end, switches are used to turn on/off the operation of the shape coding part 12 and signals therefrom, as shown in FIG. 2. In FIG. 2, a signal, shape__coding__flag, is applied to control the switches.

A motion information bitstream, estimated and coded by the motion estimation part 13, a texture information bitstream, coded by the texture coding part 18 and a shape information bitstream, coded by the shape coding part 12 are multiplexed by a multiplexer 19 and then buffered by a buffer 20. Finally, a multiplexed bitstream is transmitted to a decoder through a transmission medium. Although not shown in FIG. 2, VOP-unit overhead information is coded and applied to the multiplexer 19 so that it can be multiplexed together with the other bitstreams and then transmitted to the decoder. The VOP-unit overhead information will be mentioned later in more detail.

The VOP defined in the MPEG-4 standard corresponds to the frame defined in the existing standard and is thus classified into three VOP coding types, or I, P and B VOP types, in a similar manner to the frame. The VOP has the same characteristics (for example, motion compensated prediction directions) as those of the rectangular frame, with the exception that it has arbitrary shape information differently from the rectangle.

On the other hand, for the coding of an object with arbitrary shape information, macroblocks may be classified into three types in association with the shape information. The first type of macroblock is present beyond an object region. This macroblock contains no object element therein and thus does not require the coding and transmission. Hereinafter, the first type of macroblock will be referred to as a "transparent macroblock". The second type of macroblock is entirely included within the object region. Techniques developed for the existing frame-based coding are applicable directly to the second type of macroblock. Hereinafter, the second type of macroblock will be referred to as an "opaque macroblock". The third type of macroblock is present both within the object region and a non-object region, and it will hereinafter be referred to as a "boundary macroblock". In order to allow the receiver to decode such macroblocks, the transmitter must code and transmit the shape information indicative of the object region and the texture information in the object region. Of course, in the case of macroblocks subjected to the motion estimation and compensation like the inter macroblocks in the P and B frames, the motion information must further be coded and transmitted.

FIG. 3 shows an example of transparent macroblocks (TMBs), opaque macroblocks (OMBs) and boundary macroblocks (BMBs) In this drawing, a slashed part represents an object region to be coded and small tetragons represent macroblocks, respectively. In this example, the macroblocks, TMBs, present beyond the object region are six in number, the macroblocks, OMBs, present within the object region are twelve in number and the macroblocks, BMBs, present both within and beyond the object region are twenty-two in number.

Now, a detailed description will be given of the above-mentioned frame-based coding method and object-based coding method. FIG. 4 shows an example of an experimental image illustrating the object-based coding method, which is one frame showing a scene where two children are playing with a ball within an arbitrary space (background). The frame-based coding method is generally adapted to code and transmit texture values (luminance and chrominance values) of all pixels in the frame. But, the object-based coding method is used in the case where the transmission of only information regarding the children and ball is required among the entire video information in the frame. Namely, the object-based coding method can code and transmit only texture values of pixels belonging to the children and ball. In this case, a region of the children and ball to be coded is defined as an object, and a non-object region is defined as a background.

For compression-coding a video using the object-based coding method, an encoder and decoder should recognize pixels belonging to the object (namely, the children and ball) and pixels belonging to the background, among all pixels in the frame. Information for separating the image into the object region and the background region is typically called shape information of the object. The encoder has to compression-code and transmit the shape information to allow the decoder to recognize the shape information.

FIG. 5 shows an example of a binary image representing the shape information of the image in FIG. 4. The shape information may be represented as either binary shape information or gray scale shape information. The binary shape information is used to make a distinction between object and background. As seen from FIGS. 4 and 6, the shape information may be represented as a contour which is the boundary between the background and object.

The binary shape information is represented by two values specifying the background region and object region, respectively. For example, in the case where pixels of the shape information are expressed by 8 bits, a pixel belonging to the background may be specified to have a value of "0" and a pixel belonging to the object may be specified to have a value of "255". It is not necessary to fix the background and object values respectively to the values of "0" and "255". The background and object values may have two arbitrary values, respectively, so far as they are distinguishable from each other and the associated distinguishing method can be recognized by the encoder and decoder.

The binary information is extensible in such a manner that the background and object values can be mixed at a proper ratio to represent a synthetic image. Assume that, in a shape information frame, a pixel belonging to the background has the value of 0 and a pixel belonging to the object has the value of 255. In this case, a pixel of the synthetic image corresponding to the position of the pixel with the 0 value has background texture information, and a pixel of the synthetic image corresponding to the position of the pixel with the 255 value has object texture information. On the other hand, if the pixels belonging to the background and object have intermediate values between 0 and 255, the synthetic image may have intermediate values between the background texture information and the object texture information. This example can be derived from a television (TV). In the case where characters are written on a screen of the TV, a picture background behind screen portions covered with the characters may be seen or not. If the picture background is not seen, it can be regarded as the binary shape information. To the contrary, if the picture background is seen, it can be regarded as a synthesis of background information and character information. In this manner, certain shape information may include synthesis enable information as well as information indicative of whether a given pixel is a background or an object. Such shape information is generally called gray scale shape information.

Generally, pixels in a gray scale shape information frame may have two or more different values within a predetermined range. In the case where pixels in the gray scale shape information frame are expressed by 8 bits, they may have any values within the range of 0 to 255. If a pixel in the gray scale shape information frame has the value of 0, a pixel of a synthetic image at the same position has background texture information. Also, if a pixel in the gray scale shape information frame has the value of 255, a pixel of the synthetic image at the same position has object texture information. In the case where a pixel in the gray scale shape information frame has any value between 0 and 255, object and background texture information values are mixed at a proper ratio to decide the value of a pixel of the synthetic image at the same position.

FIG. 7a shows an example of background signals of an arbitrary image, and FIG. 7b shows an example of object signals of the arbitrary image. In FIG. 7b, "x" represents that no texture information is present in a given pixel because the given pixel is a non-object pixel. FIG. 8a shows an example of binary shape information of the arbitrary image, and FIG. 8b shows a synthesis of the background signals in FIG. 7a and object signals in FIG. 7b, based on the binary shape information of FIG. 8a. FIG. 9a shows an example of gray scale shape information of the arbitrary image, and FIG. 9b shows a synthesis of the background signals in FIG. 7a and object signals in FIG. 7b, based on the gray scale shape information of FIG. 9a. As shown in FIG. 9a, pixels in a gray scale shape information frame have an intermediate value between 0 and 255 as well as the values of 0 and 255, differently from the binary shape information of FIG. 8a. In a synthetic image of FIG. 9b, each pixel has a mixed value of the background and object signals when the corresponding gray scale shape information is present between 0 and 255. For a brief description, in FIGS. 9a and 9b, when a pixel value of the gray scale shape information frame is 128, two signal values, or object and background signal values, are averaged to be used as a corresponding pixel value of the synthetic image. Here, a signal synthesizing method based on the gray scale shape information may be performed in various manners and is not especially limited in the present invention.

On the other hand, in order to allow the decoder to synthesize an image, the encoder must code and transmit gray scale shape information of the image to the decoder. The gray scale shape information is composed of binary shape information as shown in FIG. 10a and gray scale texture information as shown in FIG. 10b. The binary information of the gray scale shape information is used to represent which ones of pixels of the gray scale shape information have values larger than or equal to one. In FIG. 10a, pixels with values larger than or equal to one, among the pixels of the gray scale shape information, are represented by 255. The information of FIG. 10b is used to represent values of the pixels of the gray scale shape information. In the present invention, such information is defined as gray scale texture information.

A binary shape information coding method may be applied directly to the binary shape information of the gray scale shape information to compression-code and transmit it. An image texture information (see FIG. 7b) coding method may be used to compression-code and transmit the gray scale texture information of the gray scale shape information. However, because the gray scale texture information and image texture information are very different in signal characteristic, a coding efficiency may considerably be reduced when the image texture information coding method is applied directly to the gray scale texture information.

Next, a description will be given of a conventional method for coding the gray scale texture information of the gray scale shape information. As in either the binary shape information coding method or image texture information coding method, the gray scale shape information is coded on the basis of a macroblock unit, which generally has a size of 16 pixels/line×16 lines. Such a macroblock unit will hereinafter be referred to as a "gray macroblock".

For coding the gray scale texture information, it must first be determined whether pixels of the gray macroblock all have a value of "0", or whether at least one of the pixels of the gray macroblock has any other value than "0". Of course, this determination can be performed in the same manner by a coder in a transmitter and a decoder in a receiver through binary shape information coding and decoding procedures. If the pixels of the gray macroblock all have the value of "0", the coding procedure need not be further performed because no pixel belonging to an object region is present in the gray macroblock. In the case where at least one of the pixels of the gray macroblock has any other value than "0", the coding procedure is started. The former macroblock is defined-as a transparent gray macroblock, and the latter macroblock is defined as a non-transparent gray macroblock. Similarly to the gray scale texture information, the coding procedure for image texture information is applied to only the non-transparent gray macroblock.

A method for coding gray scale texture information of a non-transparent gray macroblock may be classified into two types, or an intra coding method and an inter coding method, which are selectively performed depending on determination based on image texture information. In other words, if the intra coding method is performed for image texture information, it is similarly applied to gray scale texture information in the same macroblock. Also, if the inter coding method is performed for image texture information, it is similarly applied to gray scale texture information in the same macroblock. To this end, the coding operation is performed for the image texture information earlier than the gray scale texture information.

In the case where the intra coding method is performed with respect to the gray scale texture information, it is determined whether gray scale texture information values, or pixel values, in a given gray macroblock are all 255. Then, information, coda_i, is transmitted to the receiver to indicate whether all the pixel values in the given gray macroblock are 255. If all the pixel values in the given gray macroblock are 255, the coding operation is not further performed. In the case where at least one of the pixel values in the given gray macroblock is not 255, the coding operation is performed continuously.

In the case where the inter coding method is performed with respect to the gray scale texture information, a motion compensated prediction operation is performed to transmit a prediction error. At this time, motion information of image texture information is directly used for the motion compensated prediction operation. Also, a motion compensated prediction mode of the image texture information is directly used for the motion compensated prediction operation. The inter coding method may be performed in different manners according to the case where all pixels in a given gray macroblock have a value of 255, the case where no prediction error to be transmitted is present because of accurate motion compensated prediction and the case where a motion compensated prediction error should be transmitted. Further, information, coda_pb, indicative of a selected one of those cases is variable length coded and transmitted to the receiver. The first two cases are not subjected to further coding because the coding operation need not be further performed. The coding operation is continuously performed in the last case, or the case where the prediction error should be transmitted. In the first case, the decoder reconstructs a gray macroblock where all pixels have the value of 255. In the second case, the decoder reconstructs a gray macroblock using the motion information and motion compensated prediction mode of the image texture information.

Input gray scale texture information of an intra gray macroblock and a prediction error signal of an inter gray macroblock are coded and transmitted in a similar manner to the image texture information. In other words, a given gray macroblock is partitioned into four blocks with the same size and a discrete cosine transform (DCT) operation is performed for each of the four blocks if it is a non-transparent block. Then, a quantization operation is performed with respect to the resultant DCT coefficients, and DC and AC coefficients are variable length coded and transmitted. Here, similarly to a non-transparent gray macroblock, the non-transparent block signifies that at least one of pixels therein has any other value than "0". For the intra gray macroblock, after the quantization operation is performed, a DC coefficient of each subblock is predictive-coded on the basis of a DC coefficient of a subblock adjacent thereto. An AC coefficient of each subblock is predictive-coded in the same manner as the DC coefficient. To this end, for the intra gray macroblock, a flag, ac_pred_flag_alpha, is transmitted to indicate whether the AC coefficient has been predictive-coded. Quantization scale information used for the gray scale texture information coding may be appended to VOP header information to be transmitted. Alternatively, this quantization scale information may be determined at a desired ratio to that of the image texture information and thus need not be separately transmitted on the basis of a macroblock unit.

In the gray scale texture information coding method, coded block pattern information (cbpa) is transmitted like coded block pattern information in the image texture information coding method. The coded block pattern information is used to indicate whether an AC coefficient to be transmitted is present in each DCT-processed non-transparent block of a given macroblock. If the coded block pattern information is 0 in value, the decoder reconstructs a gray macroblock using only DC information.

In brief, in the intra coding method for the gray scale shape information, the binary shape information is coded and transmitted in the conventional manner, and the gray scale texture information is coded and transmitted in a similar manner to the conventional image texture information coding method. The information transmitted to the decoder includes information indicative of whether a given gray scale texture information macroblock has been coded, overhead information such as the flag ac_pred_flag_alpha and the coded block pattern information, and DC and AC information of the gray scale texture information.

On the other hand, a bitstream produced by compression-coding a digital moving video signal may be transmitted through a channel in which a transmission error may often occur, such as a mobile communication channel. In this case, when a received bitstream is decoded by the receiver, a reconstructed picture may be considerably damaged in quality due to the transmission error. Research has actively been done for minimizing problems resulting from the transmission error, and the resultant representative techniques may be error detection, error localization and data recovery, which are commonly called "error resilient techniques". Also, a bitstream structure reflecting such techniques is called an "error resilient bitstream".

Such error resilient techniques are shown in the MPEG-4 FDIS including the VOP-unit coding and will hereinafter be described briefly. These techniques are applicable to both the object-based coding with arbitrary shape information and the frame-based coding.

The first error resilient coding technique is a resynchronization method. A resynchronization marker, resync marker, enables resynchronization between a bitstream after error detection and the decoder. In the case where an error occurs on a bitstream, bitstreams between a resynchronization point just before the error occurrence and a resynchronization point just after the error occurrence are generally neglected. Provided that the resynchronization method is able to effectively localize or minimize the amount of data to be neglected in the decoder, other techniques (for example, data recovery and error concealment) associated with the error resilience can be enhanced in performance.

A resynchronization method of MPEG-4 adopts an error resilient bitstream structure analogous to a group of blocks (GOB) structure used in H.261 or H.263 which is the moving video coding standard of ITU-T. In these standards, the GOB is composed of at least one macroblock row. When a new GOB is started in the coding procedure, a GOB header is positioned on a bitstream. The GOB header includes a GOB start code for notifying the decoder of the position of the GOB. In addition to the GOB start code, the GOB header includes information necessary to resuming the decoding procedure. This GOB method is a spatial resynchronization method. In other words, when the coding procedure reaches the position of a specific macroblock, a resynchronization signal, or resync marker, is inserted into a bitstream. However, the GOB method has a disadvantage in that resynchronization signals cannot be positioned on bitstreams at regular intervals when the coding procedure is performed at a variable bit-rate.

In order to avoid such a problem, the MPEG-4 resynchronization method is adapted to periodically insert resynchronization signals into bitstreams. To this end, a video packet, or a group of bitstreams between resynchronization signals, is provided on the basis of the number of bits included therein instead of the number of macroblocks. If, after the coding of one macroblock is ended, the number of bits accumulated in a given video packet exceeds a predetermined threshold value, a new video packet is started from the next macroblock.

FIG. 11 shows an example of an error resilient bitstream structure using a resynchronization signal. A bitstream of MPEG-4 is sequentially composed of a video packet header and a video packet. The video packet header includes a resync marker, macroblock number, quantization scale and header extension code (HEC). The video packet includes actual macroblock data. The resynchronization signal indicates the start of a new video packet. To this end, the resynchronization signal must be distinguished from all possible VLC codes and other start codes such as VOP start code. Header information including the resynchronization signal is positioned at the start of a video packet. The header information is essential in, after an error occurs in a video packet, resuming the decoding procedure beginning with the position of a resynchronization signal nearest to the error occurrence position. Also, the header information includes information such as a macroblock number indicative of the position of a first macroblock in a given video packet and a quantization parameter (quantization scale).

The video packet header may include a "header extension code (HEC)" which is VOP-unit overhead information. In the case where VOP-unit information is damaged due to a transmission error, the decoding operation can be performed on the basis of the VOP-unit overhead information in the video packet header. The representative overhead information may be information VOP_coding_type, intra_dc_vlc_thr, VOP_fcode_forward and VOP_fcode_backward. The VOP_coding_type information indicates which one of I, P and B VOPs is to be now coded. The intra_dc_vlc_thr information indicates whether a VLC table of AC information is used for the coding of DC information. The VOP_fcode_forward information indicates a search range for forward motion estimation, and the VOP_fcode_backward information indicates a search range for backward motion estimation in the B VOP. Such information included in the header extension code is essential in allowing the decoder to decode video packets independently.

Some compression-coding methods should be modified for the use of an error resilient coding method in the MPEG-4. For example, all predictive coding methods must limit information to be used for predictions, to information in the same video packet to prevent error propagation. In other words, for predictions (for example, AC/DC prediction and motion vector prediction), a video packet boundary must be considered to be the same as a VOP boundary.

The second error resilient coding technique is a data partitioning method. The performance of an error concealment method essential to a video decoder strong against a transmission error is very dependent on the resynchronization method. If the resynchronization method localizes the transmission error more considerably, the error concealment method becomes higher in performance. The MPEG-4 standard has recognized the necessity of an enhanced error localization method and thus developed a new technique called data partitioning. For a P VOP, the data partitioning method is adapted to partition information of all macroblocks in a video packet on the basis of texture information and motion information and insert a second resynchronization signal between the motion information and the texture information. In this case, overhead information is transmitted to the receiver to notify the decoder of the fact that the data partitioning method is used. For distinction from the existing resynchronization signal, the second resynchronization signal for the data partitioning is denoted as motion_marker.

FIG. 12 shows an example of an error resilient bitstream structure to which the data partitioning method is applied. As shown in this drawing, in the data partitioning method, the macroblock data of FIG. 11 is partitioned into motion and overhead information and texture information via a motion marker. The accurate decoding of the motion marker signifies that motion information of all macroblocks in a given video packet and the associated overhead information have accurately been decoded. Upon detecting the presence of a transmission error in a texture information bitstream to be next transmitted and decoded, the decoder neglects all texture information in a given video packet and performs motion compensated prediction from a reference VOP, previously decoded and stored in a memory, using only decoded motion information prior to a motion marker to reconstruct all macroblocks in the given video packet. On the other hand, DC information is important information in an I VOP, whereas motion information is important information in a P VOP. As a result, information of all macroblocks in a video packet are partitioned on the basis of the DC information and AC information and a resynchronization signal is inserted between the DC information and AC information. For the I VOP, motion information is not considered because motion information estimation and compensation are not performed. If the AC information is subjected to the occurrence of a transmission error, it is neglected and only the DC information is,used to reconstruct all macroblocks in a given video packet. In this case, the inserted resynchronization signal is denoted as "dc_marker".

As mentioned above, the data partitioning method is advantageous in that it can reduce the amount of information to be neglected upon the occurrence of a transmission error. In the case of FIG. 11 to which the data partitioning method is not applied, all information in one video packet are discarded if a transmission error is detected from the video packet. Then, a resynchronization signal following the occurrence of the transmission error is detected and the decoding operation is resumed from that time. But, in the case where the data partitioning method is applied to the P VOP as in FIG. 12, when a transmission error occurs in texture information, motion information is not neglected, but used for the reconstruction of a video signal. Also, in the case where the data partitioning method is applied to the I VOP, when a transmission error occurs in AC information, DC information is not neglected, but used for the reconstruction of a video signal.

The resynchronization method and data partitioning method have been described until now.

The third error resilient technique is a reversible variable length code (referred to hereinafter as RVLC) method. In the RVLC method, a coding table is designed to enable the decoding operation bidirectionally, or in the forward direction and reverse direction. The reverse decoding operation is performed beginning with the position of a resynchronization signal just after an error occurrence point with respect to a bitstream for which the forward decoding operation is impossible due to the presence of an error. As a result, the RVLC method can reduce the number of bits to be neglected in the decoder because of a transmission error. In the MPEG-4 standard, the RVLC method is now applied to only the coding of DCT coefficients.

Among the error resilient techniques as stated above, the data partitioning method is difficult to apply to a conventional gray scale shape information coding method. The conventional gray scale shape information coding method has been developed on the assumption that it is applied to an environment with little transmission error, such as a digital TV. For this reason, the error resilient techniques have not been necessary to the gray scale shape information coding method. However, in the case where the coding and transmission of gray scale shape information is required to be applied to a mobile communication environment in which a transmission error often occurs, the gray scale shape information coding method has a disadvantage in that picture quality is considerably degraded due to the transmission error.

For a better understanding of the above problem, a conventional data partitioning coding method will hereinafter be described in more detail under the condition that it is applied respectively to an intra picture (I frame) and an inter picture (P frame or B frame).

FIG. 13 is a flowchart illustrating a conventional video packet coding method for an intra picture. Assuming that the number of macroblocks in one video packet is $N_{MB}$, all shape information of the $N_{MB}$ macroblocks, DC information and overhead information for the decoding of the DC information are first transmitted. In the case where a given macroblock is a transparent macroblock with no object pixel, there is no necessity for transmitting the DC information and the overhead information for the decoding of the DC information. After then, dc_marker information, AC information of the $N_{MB}$ macroblocks and overhead information for the decoding of the AC information are transmitted. The dc_marker information is a signal for distinguishing the DC information and the AC information from each other. Hence, the dc_marker signal should be distinguished from all possible codes in the encoder.

The above-mentioned conventional intra picture data partitioning coding method may cause numerous problems when it is applied to the coding of gray scale shape information. That is, the conventional intra picture data partitioning coding method does not consider overhead information for the decoding of gray scale texture information of the gray scale shape information at all. For this reason, in the case where the gray scale shape information is transmitted according to the conventional data partitioning coding method, it cannot be appropriately reconstructed in the decoder due to information insufficiency.

FIG. 14 is a flowchart illustrating a conventional video packet coding method for an inter picture. Assuming that the number of macroblocks in one video packet is $N_{MB}$, all shape information of the $N_{MB}$ macroblocks, motion information and overhead information for the decoding of the motion information are first transmitted. Then, motion_marker information, texture information of the $N_{MB}$ macroblocks and overhead information for the decoding of the texture information are transmitted. The motion marker information is a signal for distinguishing the motion information and the texture information from each other. Hence, the motion marker signal should be distinguished from all possible codes in the encoder.

The overhead information for the decoding of the motion information may be a flag indicating that no bit to be coded is present in a given macroblock, and information indicative of a motion information transmission mode (for example, there may be a mode for transmitting one motion information per macroblock and a mode for transmitting four motion information per macroblock). The overhead information for the decoding of the texture information may be information indicating whether a texture coefficient to be transmitted is present in a given block, and a flag indicating whether a texture information AC coefficient is to be predictive-coded.

The above-mentioned conventional inter picture video packet coding method may have numerous problems when it is applied to the coding of gray scale shape information. For example, the conventional inter picture video packet coding method does not consider overhead information for the decoding of the gray scale shape information at all. In this connection, in the case where the conventional inter picture video packet coding method is applied directly to the coding of gray scale shape information, the decoder cannot properly cope with the occurrence of a transmission error.

SUMMARY OF THE INVENTION

Therefore, the present invention has been made in view of the above problems caused when a conventional data partitioning coding method is applied to the coding of gray scale shape information, and it is an object of the present invention to provide a method for coding a digital moving video including gray scale shape information, in which the gray scale shape information can be coded and decoded so that a picture of high quality can be reconstructed by a decoder, and the compression-coded moving video can be transmitted with a degradation in picture quality resulting from a transmission error being minimized.

In accordance with the present invention, the above and other objects can be accomplished by a provision of a method for coding a digital moving video including gray scale shape information, comprising the first step of transmitting picture-unit overhead information; the second step of determining whether a video packet to be coded is a first packet of a given picture; the third step of transmitting a video packet header including overhead information for the decoding of the gray scale shape information if it is determined at the second step that the video packet is not the first packet of the given picture; the fourth step of determining whether the given picture is an intra picture; the fifth step of coding and transmitting the video packet in an intra picture mode if it is determined at the fourth step that the given picture is the intra picture; the sixth step of coding and transmitting the video packet in an inter picture mode if it is determined at the fourth step that the given picture is not the intra picture; and the seventh step of determining whether the video packet is a last packet of the given picture, after it is coded and transmitted at the fifth or sixth step, returning to the second step if the video packet is not the last packet of the given picture and ending a digital moving video coding operation if the video packet is the last packet of the given picture.

BRIEF DESCRIPTION OF THE DRAWINGS

The above and other objects, features and advantages of the present invention will be more clearly understood from the following detailed description taken in conjunction with the accompanying drawings, in which:

FIG. 3 is a view showing an example of transparent macroblocks (TMBs), opaque macroblocks (OMBs) and boundary macroblocks (BMBs);

FIG. 7a is a view showing an example of background signals of an arbitrary image;

FIG. 7b is a view showing an example of object signals of the arbitrary image;

FIG. 8a is a view showing an example of binary shape information of the arbitrary image;

FIG. 8b is a view showing a synthesis of the background signals in FIG. 7a and object signals in FIG. 7b, based on the binary shape information of FIG. 8a;

FIG. 9a is a view showing an example of gray scale shape information of the arbitrary image;

FIG. 9b is a view showing a synthesis of the background signals in FIG. 7a and object signals in FIG. 7b, based on the gray scale shape information of FIG. 9a;

FIG. 10a is a view showing an example of binary shape information of the gray scale shape information;

FIG. 10b is a view showing an example of gray scale texture information of the gray scale shape information;

FIG. 11 is a view showing an example of an error resilient bitstream structure using a resynchronization signal;

FIG. 12 is a view showing an example of an error resilient bitstream structure to which a data partitioning method is applied;

FIG. 15 is a flowchart illustrating a method for coding a digital moving video including the gray scale shape information in accordance with the present invention;

DETAILED DESCRIPTION OF THE PREFERRED EMBODIMENTS

Figure 1:
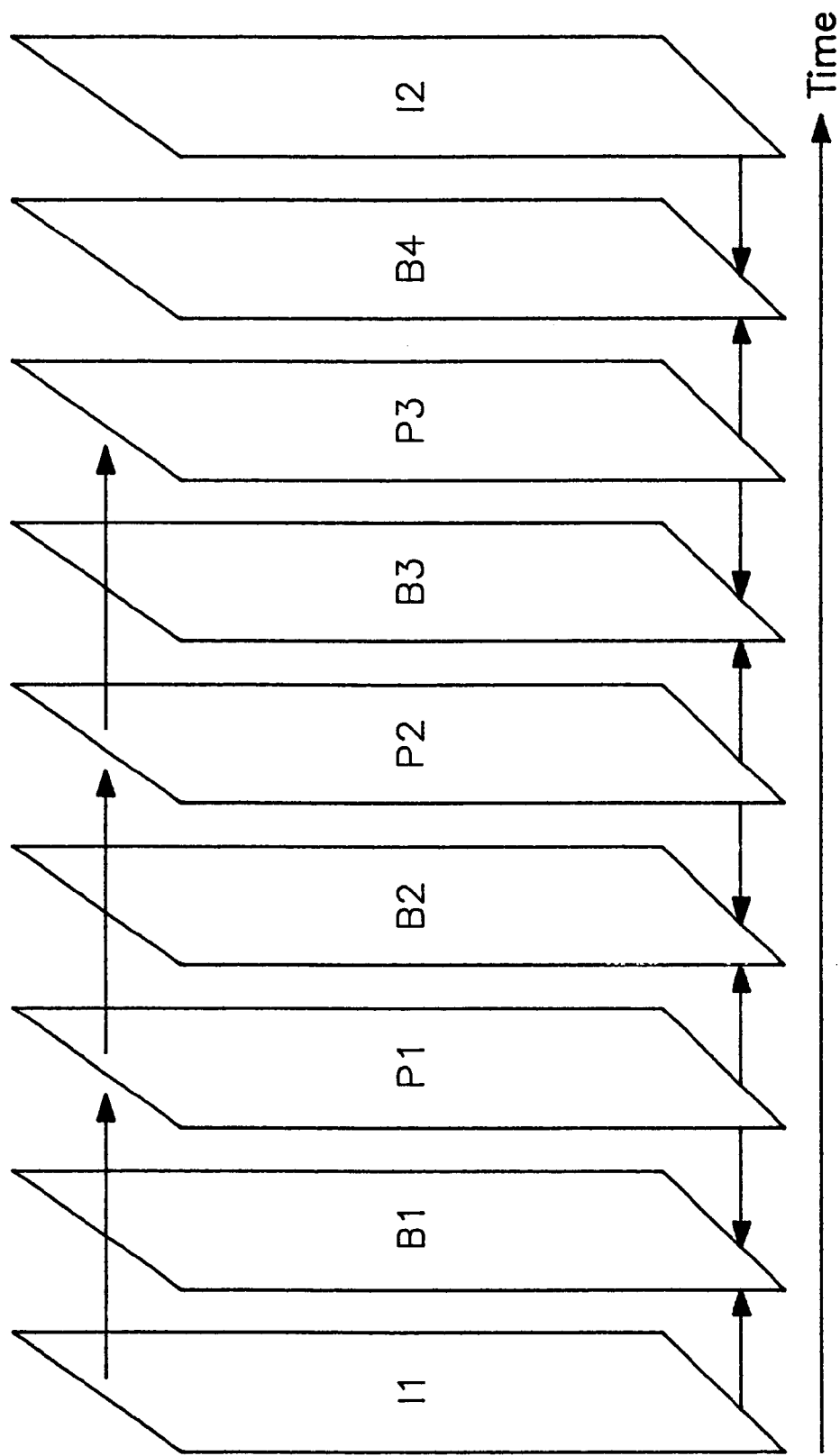
FIG. 1 is a view showing an example of frame coding types (I, P and B frame types) and the associated prediction directions.
Figure 2:
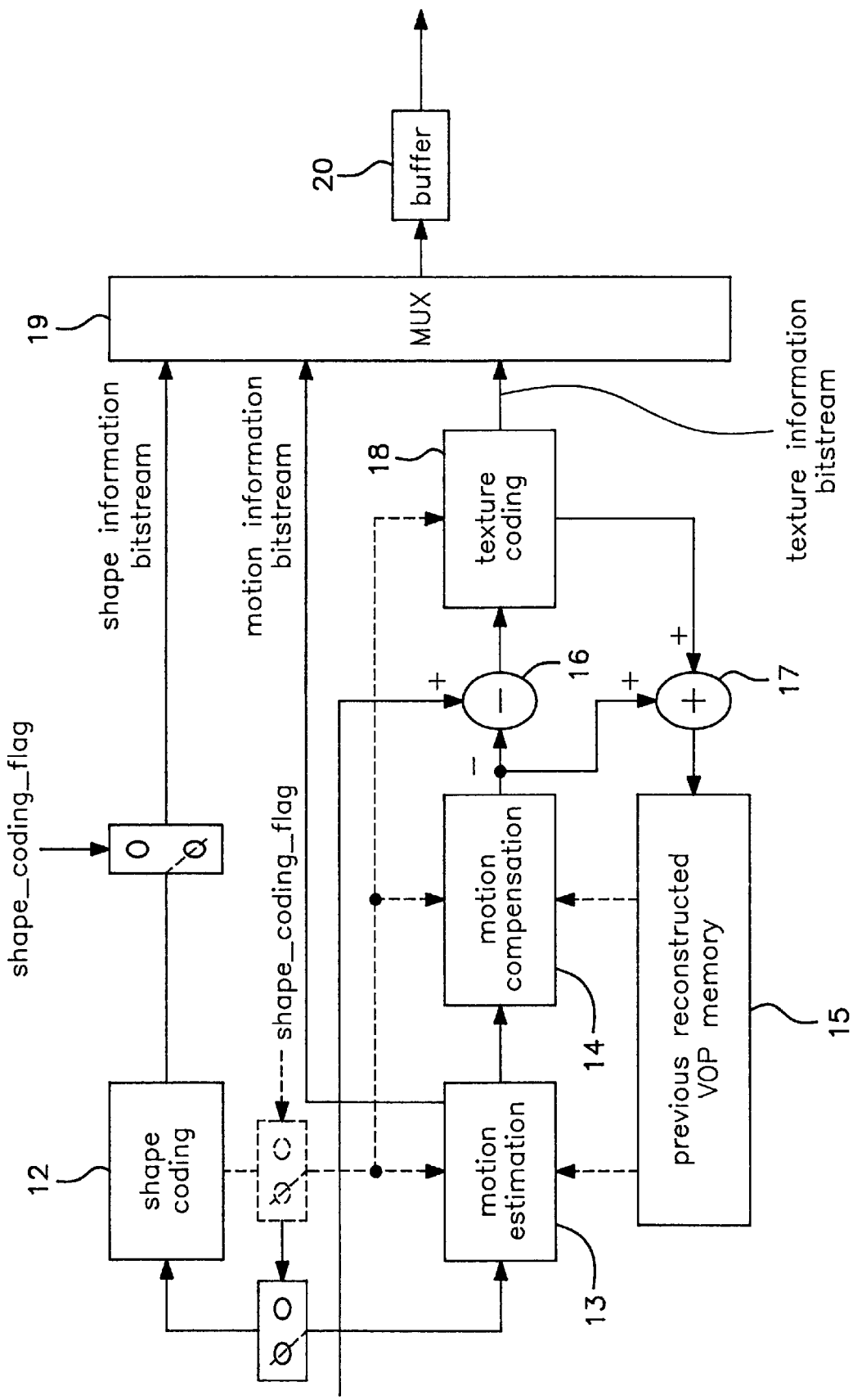
FIG. 2 is a block diagram of an MPEG-4 moving video encoder established by ISO/IEC JTC1/SC29/WG11.
Figure 4:
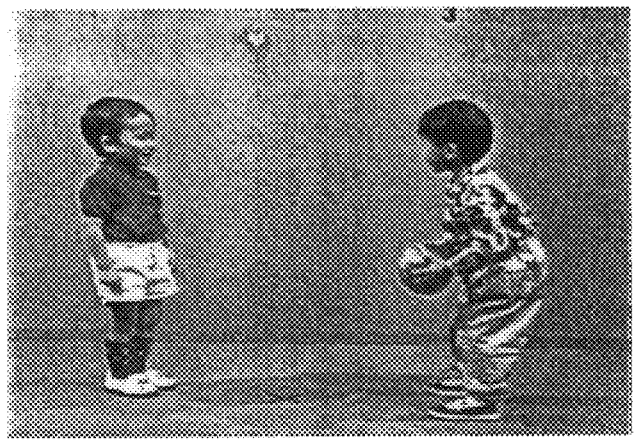
FIG. 4 is a view showing an example of an experimental image for an object-based coding method.
Figure 5:
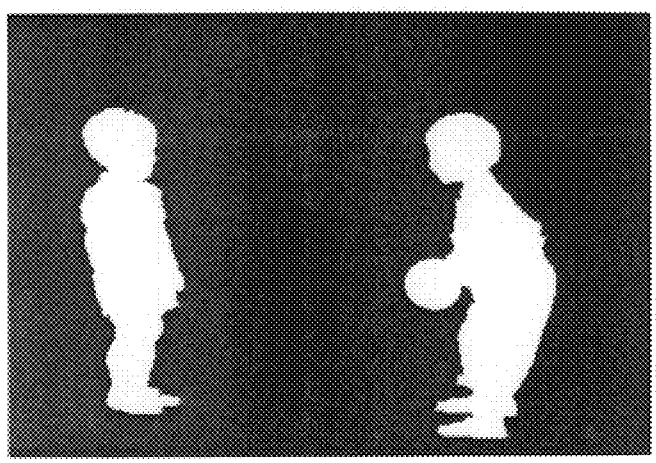
FIG. 5 is a view showing an example of a binary image representing shape information of the image in FIG. 4.
Figure 6:
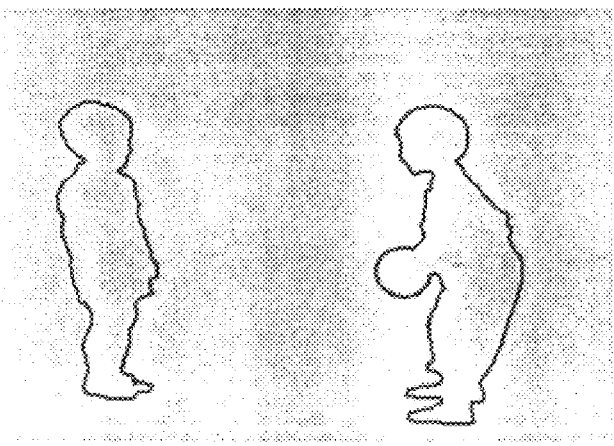
FIG. 6 is a view showing an example of a contour representing the shape information of the image in FIG. 4.
Figure 13:
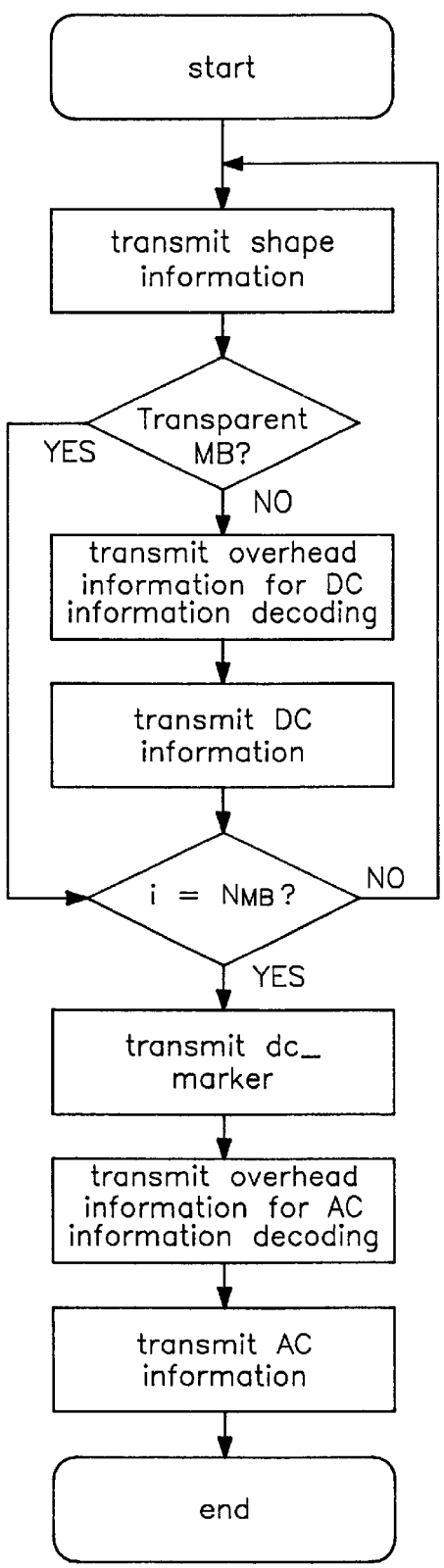
FIG. 13 is a flowchart illustrating a conventional video packet coding method for an intra picture.
Figure 14:
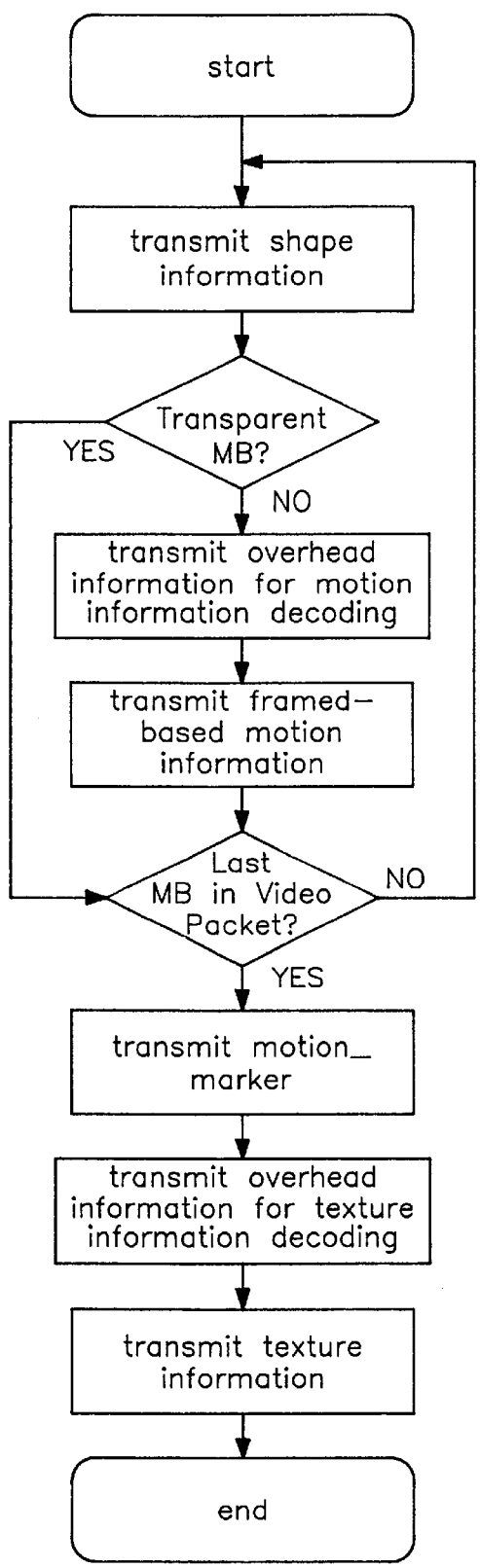
FIG. 14 is a flowchart illustrating a conventional video packet coding method for an inter picture.

FIG. 15 is a flowchart illustrating a data partitioning coding method for coding intra and inter pictures of a moving video including gray scale shape information on the basis of a video packet unit, respectively, in accordance with the present invention.

Now, a method for coding a digital moving video including gray scale shape information in accordance with the present invention will be mentioned in detail with reference to FIG. 15. A picture coding operation is started upon receiving one picture of the digital moving video to be coded. To this end, picture-unit overhead information for the picture coding operation is transmitted at the first step S1. The picture-unit overhead information may be somewhat different according to the associated standards or applications, but it is not especially limited in the present invention. For example, in the MPEG-4 standard, the picture-unit overhead information may be picture coding type information, vop_coded and vop_rounding_type, image texture quantization scale information and gray scale texture quantization scale information. But, in the present invention, the picture-unit overhead information must essentially include picture coding type information indicative of whether a given picture to be coded is an inter picture or an intra picture, and gray scale texture quantization scale information.

The third step S3 is performed to transmit a video packet header including overhead information for a gray scale shape information decoding operation, preceding the associated video packet. Noticeably, because a first video packet of each picture follows the overhead information transmitted at the first step S1, transmission of video packet header of the first video packet is not necessary. This processing is controlled by the second step S2. Namely, the second step S2 is performed to determine whether a video packet to be coded is a first packet of a given picture and control the third step S3 in accordance with the determined result. If it is determined at the second step S2 that the video packet to be coded is not the first packet of the given picture, the video packet header is transmitted at the third step S3. The video packet header includes picture-unit overhead information to be used when the picture-unit overhead information transmitted at the first step S1 is damaged due to a transmission error. Similarly to the picture-unit overhead information at the first step S1, the picture-unit overhead information at the third step S3 is not especially limited in the present invention. But, in the present invention, the picture-unit overhead information must essentially include picture coding type information indicative of whether a given picture to be coded is an inter picture or an intra picture, and gray scale texture quantization scale information.

The third step S3 is one of the kernels of the present invention. As stated previously, the video packet header basically includes a header extension code. The header extension code includes information used when a transmission error occurs in the video packet header. Information other than the header extension code in the video packet header may be information regarding a first macroblock in the associated video packet, such as information regarding the position of the first macroblock, and quantization scale information. In the present invention, the third step S3 is performed in the following manner for the transmission of information for the gray scale shape information decoding operation. A quantization scale used for a gray scale shape information coding operation is classified into two types, or a picture-unit quantization scale and a macroblock-unit quantization scale. The macroblock-unit quantization scale is determined according to a relational expression between the picture-unit quantization scale, previously provided, and a quantization scale used for the coding of image texture information of a given macroblock. In this regard, at the third step S3, information regarding a picture-unit quantization scale of gray scale texture information of the gray scale shape information is appended to a video packet header to be transmitted. In the case where macroblock-unit gray scale texture quantization scale information is damaged, it can be recognized on the basis of picture-unit gray scale texture quantization scale information and macroblock-unit image texture quantization scale information, both included in a video packet header of a given video packet.

The fourth step S4 is performed to determine whether the given picture is an intra picture or an inter picture and control the fifth and sixth steps S5 and S6 in accordance with the determined result. If the given picture is the intra picture at the fourth step S4, the video packet to be coded is coded and transmitted in an intra picture mode at the fifth step S5. However, in the case where the given picture is the inter picture at the fourth step S4, the video packet to be coded is coded and transmitted in an inter picture mode at the sixth step S6. In other words, because the intra picture and inter picture have different important information, video packets thereof should be coded and transmitted in different manners.

The seventh step S7 is performed to determine whether the video packet coded and transmitted at the fifth or sixth step S5 or S6 is a last packet of the given picture. If the coded and transmitted video packet is not the last packet of the given picture at the seventh step S7, the entire coding operation returns to the second step S2 to process a new packet of the given packet. In the case where the coded and transmitted video packet is the last packet of the given picture at the seventh step S7, the entire coding operation is ended.

Figure 16A:
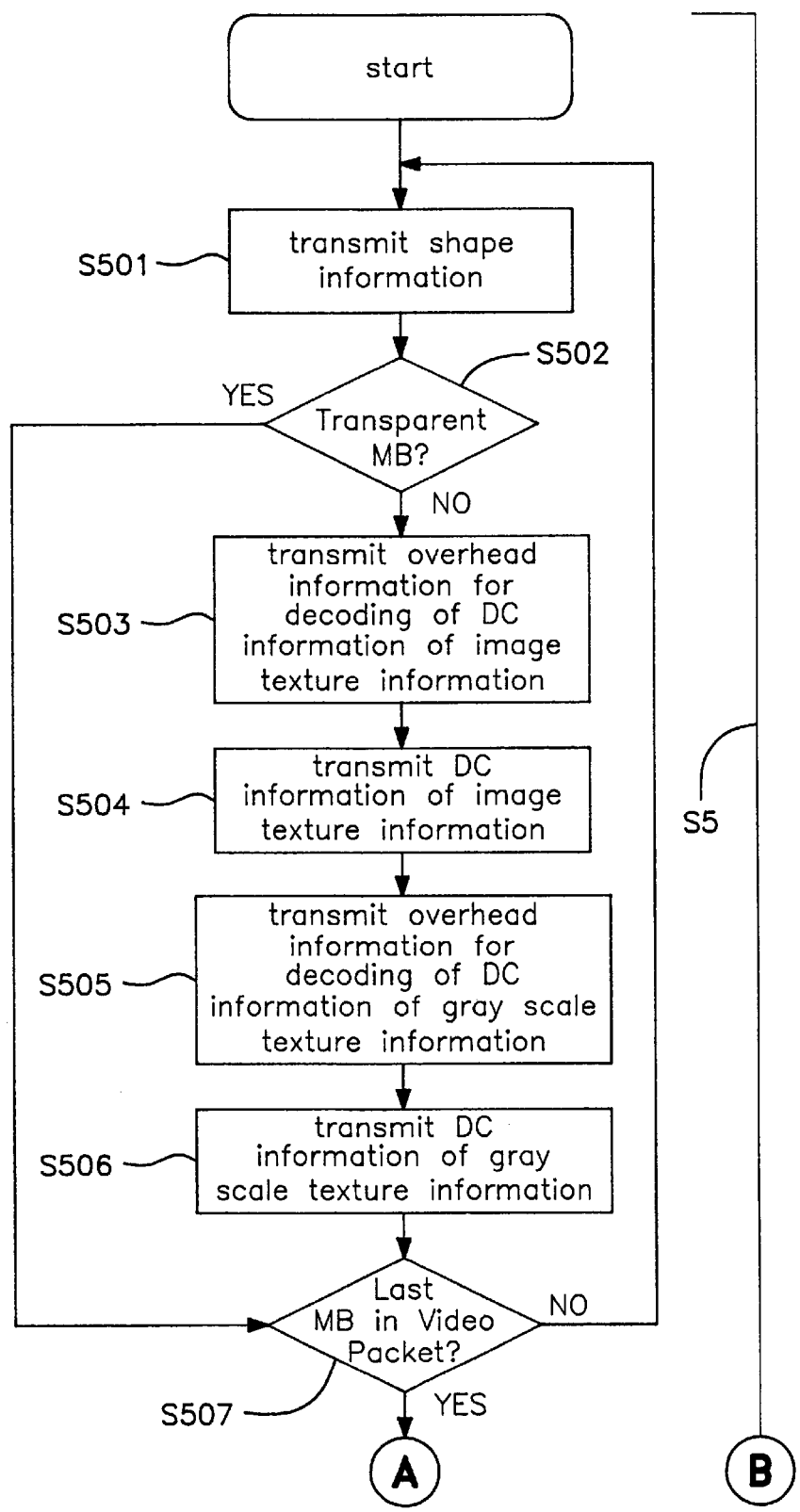
FIGS. 16A and B are a flowchart illustrating a video packet coding method for the intra picture in accordance with the present invention.

FIGS. 16A and B ("FIG. 16") are a flowchart illustrating a video packet coding method for an intra picture in accordance with the present invention. The fifth step S5 in FIG. 15 of coding and transmitting the video packet in the intra picture mode will hereinafter be described in more detail with reference to FIG. 16.

First, shape information of a given macroblock in the video packet to the coded is coded and the resultant shape information bitstream is transmitted to a decoder at step S501. It is determined at step S502 whether the given macroblock is a transparent macroblock with no object pixel. If the given macroblock is the transparent macroblock at step S502, the intra picture coding mode proceeds to step S507 because no further information to be transmitted is present.

If it is determined at the above step S502 that the given macroblock is not the transparent macroblock, overhead information for the decoding of DC information of image texture information of the given macroblock is transmitted at step S503. The overhead information. for the DC information decoding may preferably include macroblock type information and quantization scale information. It should be noted that the overhead information for the DC information decoding is not especially limited in the present invention so far as it is transmitted to the decoder.

Then, the DC information of the image texture information of the given macroblock is transmitted at step S504 and overhead information for the decoding of DC information of gray scale texture information of the given macroblock is transmitted at step S505. The overhead information for the DC information decoding may preferably include information, coda_i, indicative of whether all gray scale texture information values in the given macroblock are 255, as stated previously. The DC information of the gray scale texture information of the given macroblock is coded and transmitted at step S506. It is determined at step S507 whether the given macroblock is a last macroblock in the video packet to be coded. If the given macroblock is the last macroblock in the video packet to be coded, the intra picture coding mode proceeds to step S508. However, in the case where it is determined at step S507 that the given macroblock is not the last macroblock in the video packet to be coded, the intra picture coding mode returns to the above step S501 to process a new macroblock in the video packet to be coded.

In the present invention, the last macroblock determination step S507 may be performed in various manners. For example, the length of each video packet can be set to a predetermined number of macroblocks (for example, a GOB structure in H.263) or a given video packet can be determined to be ended if the number of bits accumulated in the given video packet exceeds a predetermined threshold value (for example, MPEG-4). In the present invention, the last macroblock determination step S507 is not limited to a specific manner.

Figure 16B:
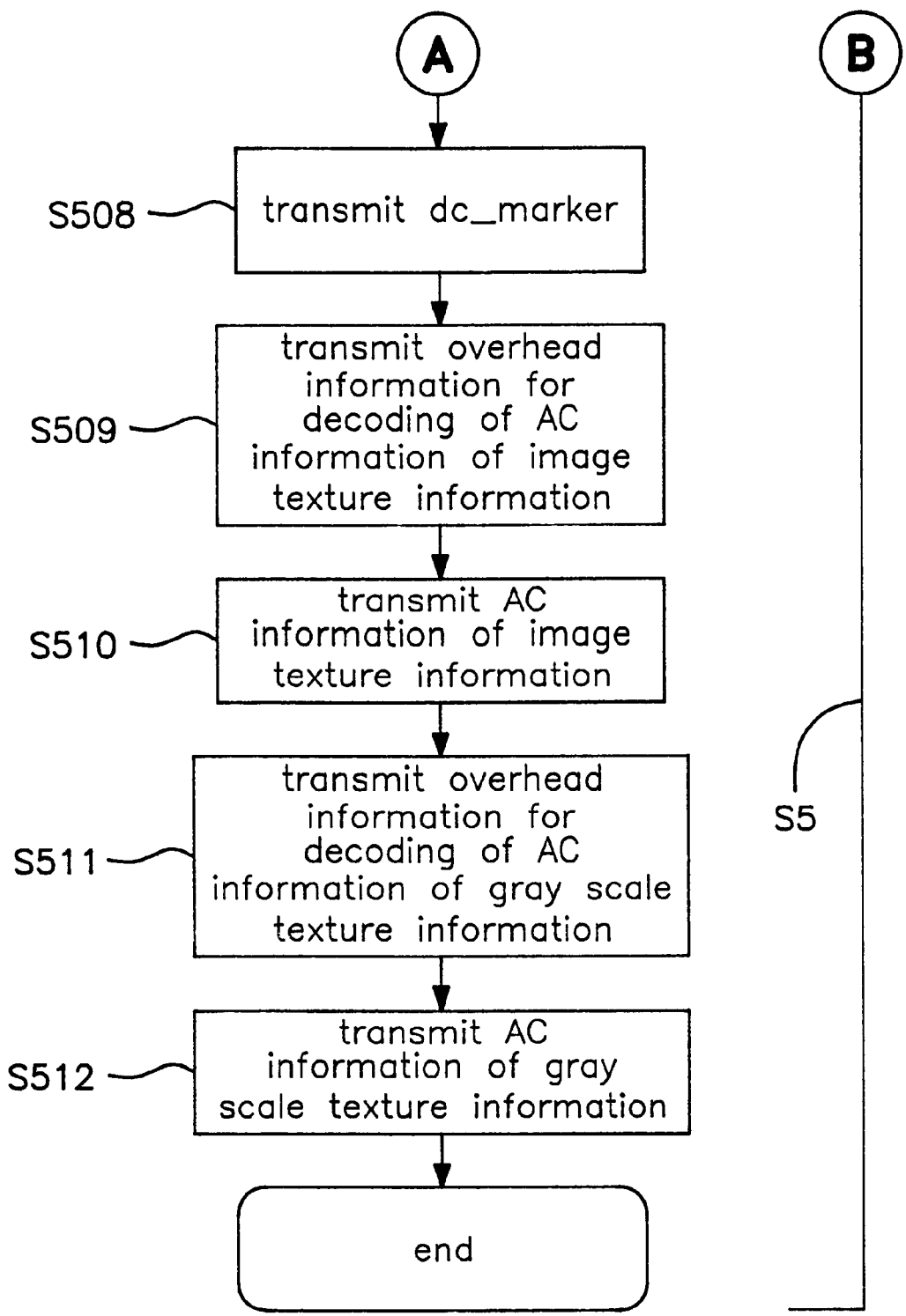

If the given macroblock is determined to be the last macroblock in the video packet at the above step S507, a marker signal, dc_marker, is transmitted at step S508 to make a distinction between DC information and AC information of image texture information of all macroblocks in the video packet. It is preferred that the marker signal dc_marker should be distinguished from all possible codes in a moving video coding system to which the intra picture coding mode of FIG. 16 is applied. For example, in the MPEG-4 standard, a bitstream of "110 1011 0000 0000 0001" may be used as the marker signal dc_marker.

Then, overhead information for the decoding of the AC information of the image texture information of all the macroblocks in the video packet to be coded is transmitted at step S509. The overhead information for the AC information decoding may preferably include coded block pattern information indicative of whether an AC coefficient to be transmitted is present in each block of each of the macroblocks in the video packet, and a signal, ac_pred_flag, indicative of whether the AC information has been predictive-coded. Then, the AC information of the image texture information of all the macroblocks in the video packet to be coded is transmitted at step S510.

Further, overhead information for the decoding of AC information of gray scale texture information of all the macroblocks in the video packet to be coded is transmitted at step S511. Similarly to that of the image texture information, the overhead information for the AC information decoding may preferably include coded block pattern information cpba and a —flag ac_pred_flag_alpha, which are substantially the same as those of the image texture information, with the exception that they are applied to the gray scale texture information. Then, the AC information of the gray scale texture information of all the macroblocks in the video packet to be coded is transmitted at step S512.

In FIG. 16, each of the above steps S509 to S512 has been shown to transmit the overhead information or AC information of all the macroblocks in the video packet at the same time. Alternatively, the above steps S509 to S512 may be performed with respect to each of the macroblocks in the video packet, sequentially from the first macroblock to the last macroblock.

The above steps S505 and S506 of the intra picture video packet coding method in FIG. 16 are the kernels of. the present invention. The overhead information for the decoding of the DC information of the gray scale texture information of the given macroblock is transmitted at the above step S505, and the DC information of the gray scale texture information of the given macroblock is coded and transmitted at the above step S506. Therefore, in the case where the moving video including the gray scale shape information is compression-coded and transmitted, the channel error effect can be minimized and a moving picture of high quality can be reconstructed by the decoder. If the marker signal dc_marker transmitted at step S508 is accurately decoded and the presence of a channel error is detected in the subsequently transmitted AC information, the image texture information and gray scale texture information following the marker signal dc_marker are neglected and the coded video packet is reconstructed on the basis of only the overhead information for the decoding of the DC information of the gray scale texture information transmitted at step S505, such as the information coda_i, and the DC information of the gray scale texture information transmitted at step S506. The decoder receives and decodes the information coda_i to determine whether all gray scale texture information values in the given macroblock are 255. If all the gray scale texture information values in the given macroblock are 255, the decoder reconstructs the gray scale texture information with those values. In the case where at least one of the gray scale texture information values in the given macroblock is not 255, the decoder receives and decodes the DC information of the gray scale texture information and reconstructs the gray scale texture information with the decoded DC information. Unless the AC and DC information of the gray scale texture information are separated from each other on the basis of the marker signal dc_marker as in the present invention, the occurrence of a transmission error increases a degradation in the picture quality of a macroblock of the gray scale texture information, reconstructed by the decoder.

Noticeably, when the information coda_i indicates a not coded state, or the state where all the gray scale texture information values in the given macroblock are 255, the DC information need not be transmitted. Furthermore, the transmission of the AC overhead information and AC information is not necessary in practice. This is similarly applied to the above step S511. That is, the AC over head information includes the coded block pattern information cpba and the flag ac_pred_flag_alpha, as mentioned above. The coded block pattern information cpba indicates whether an AC coefficient to be transmitted is present in each block of each of the macroblocks in the video packet. Accordingly, if the coded block pattern information cpba is transmitted, the AC information need not be transmitted for blocks with no AC coefficient. Upon receiving and decoding the coded block pattern information cpba, the decoder can recognize blocks with no AC coefficient and thus receive and decode AC coefficients with respect to only blocks having them.

Figure 17A:
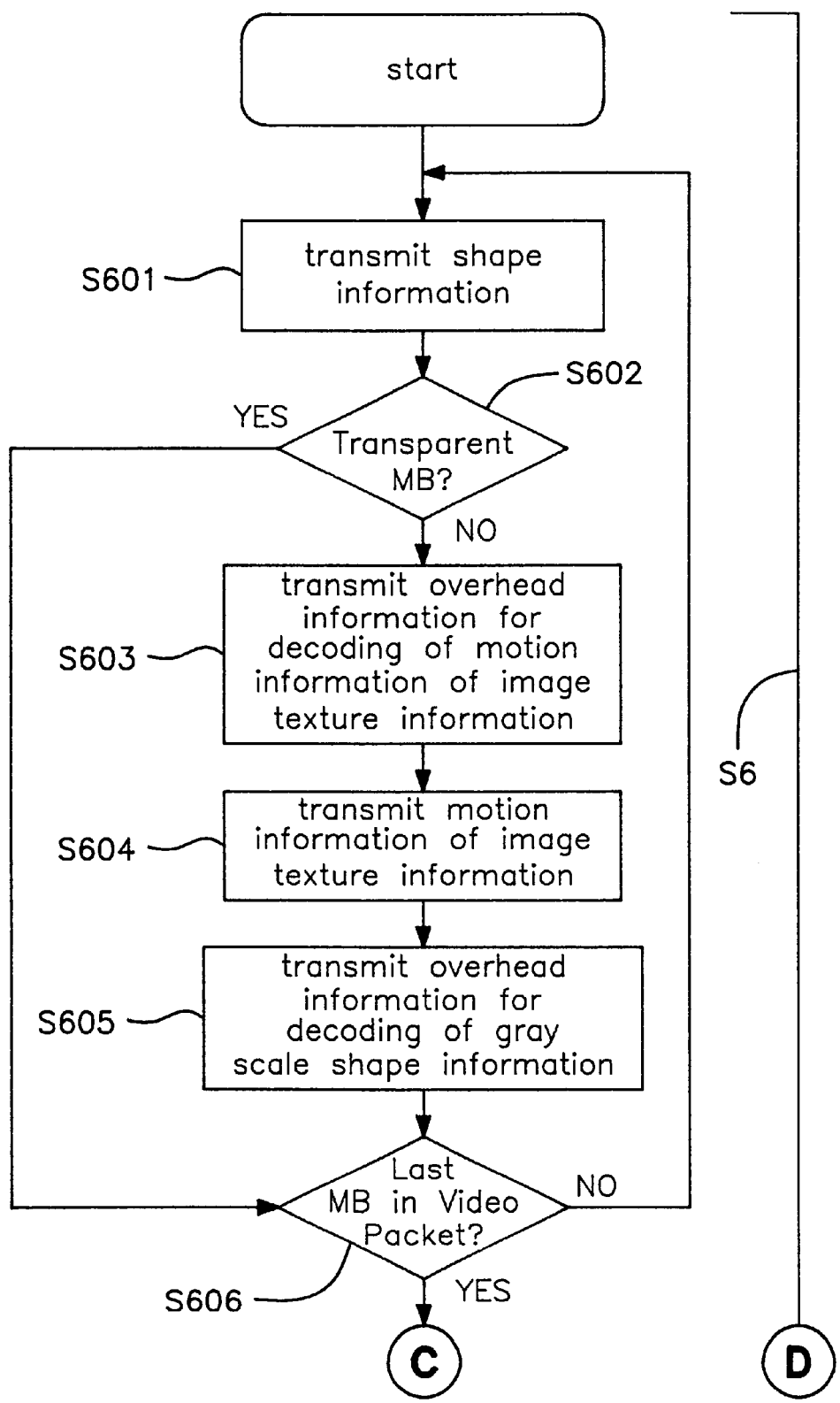
FIGS. 17A and B are a flowchart illustrating a video packet coding method for the inter picture in accordance with the present invention.

FIGS. 17A and B ("FIG. 17") are a flowchart illustrating a video packet coding method for an inter picture in accordance with the present invention. The sixth step S6 in FIG. 15 of coding and transmitting the video packet in the inter picture mode will hereinafter be described in more detail with reference to FIG. 17.

If it is determined at the fourth step S4 that the given picture is not the intra picture, shape information of a given macroblock in the video packet to be coded is coded and the resultant shape information bitstream is transmitted to a decoder at step S601. It is determined at step S602 whether the given macroblock is a transparent macroblock with no object pixel. If the given macroblock is the transparent macroblock at step S602, the inter picture coding mode proceeds to step S606 because no further information to be transmitted is present.

If it is determined at the above step S602 that the given macroblock is not the transparent macroblock, overhead information for the decoding of motion information of image texture information of the given macroblock is transmitted at step S603. The overhead information for the motion information decoding may preferably include information indicative of a coded macroblock (it indicates whether information to be transmitted is present in the given macroblock and is typically denoted as not_coded), macroblock type information and quantization scale information. It should be noted that the overhead information transmitted at the above step S603 is not especially limited in the present invention, but it must essentially include macroblock type information indicative of whether the given macroblock is an inter macroblock based on a motion compensated prediction mode or an intra macroblock, not based on the motion compensated prediction mode. After the overhead information for the motion information decoding is transmitted at the above step S603, the motion information of the image texture information of the given macroblock is transmitted at step S604.

Overhead information for the decoding of gray scale shape information of the given macroblock is transmitted at step S605. The overhead information for the gray scale shape information decoding may preferably include information, coda_pb, which is analogous to the information coda_i in the intra picture coding mode. The information coda_pb is used to make a distinction among; the case where all gray scale texture information values in the given macroblock are 255, the case where at least one of the gray scale texture information values in the given macroblock is not 255 and the case where all the gray scale texture information values in the given macroblock are 0, whereas the information coda_i is used to make a distinction between the first two cases. That is, the information coda_ pb is used because all motion compensated prediction errors may be 0 in the inter picture coding mode.

On the other hand, motion information of gray scale texture information is not generally transmitted separately from that of image texture information. In the inter picture mode, a motion compensated prediction operation is performed for the gray scale texture information on the basis of the motion information of the image texture information because the gray scale texture information and the image texture information are very analogous in motion characteristic. In the case where the motion information of the gray scale texture information is separately transmitted, a larger amount of data is transmitted while a prediction gain is not so high. For this reason, in the present invention, no motion information of the gray scale texture information is transmitted prior to the marker signal motion_marker. If the motion information of the gray scale texture information is required to be transmitted, it may be transmitted after the above step S605 is performed.

It is determined at step S606 whether the given macroblock is a last macroblock in the video packet to be coded. If the given macroblock is the last macroblock in the video packet to be coded, the inter picture coding mode proceeds to step S607. However, in the case where it is determined at step S606 that the given macroblock is not the last macroblock in the video packet to be coded, the inter picture coding mode returns to the above step S601 to process a new macroblock in the video packet to be coded. In the present invention, the last macroblock determination step S606 may be performed in various manners. For example, the length of each video packet can be set to a predetermined number of macroblocks (for example, a GOB structure in H.263) or a given video packet can be determined to be ended if the number of bits accumulated in the given video packet exceeds a predetermined threshold value (for example, the video packatet structure in MPEG-4). In the present invention, the last macroblock determination step S606 is not limited to a specific manner.

Figure 17B:
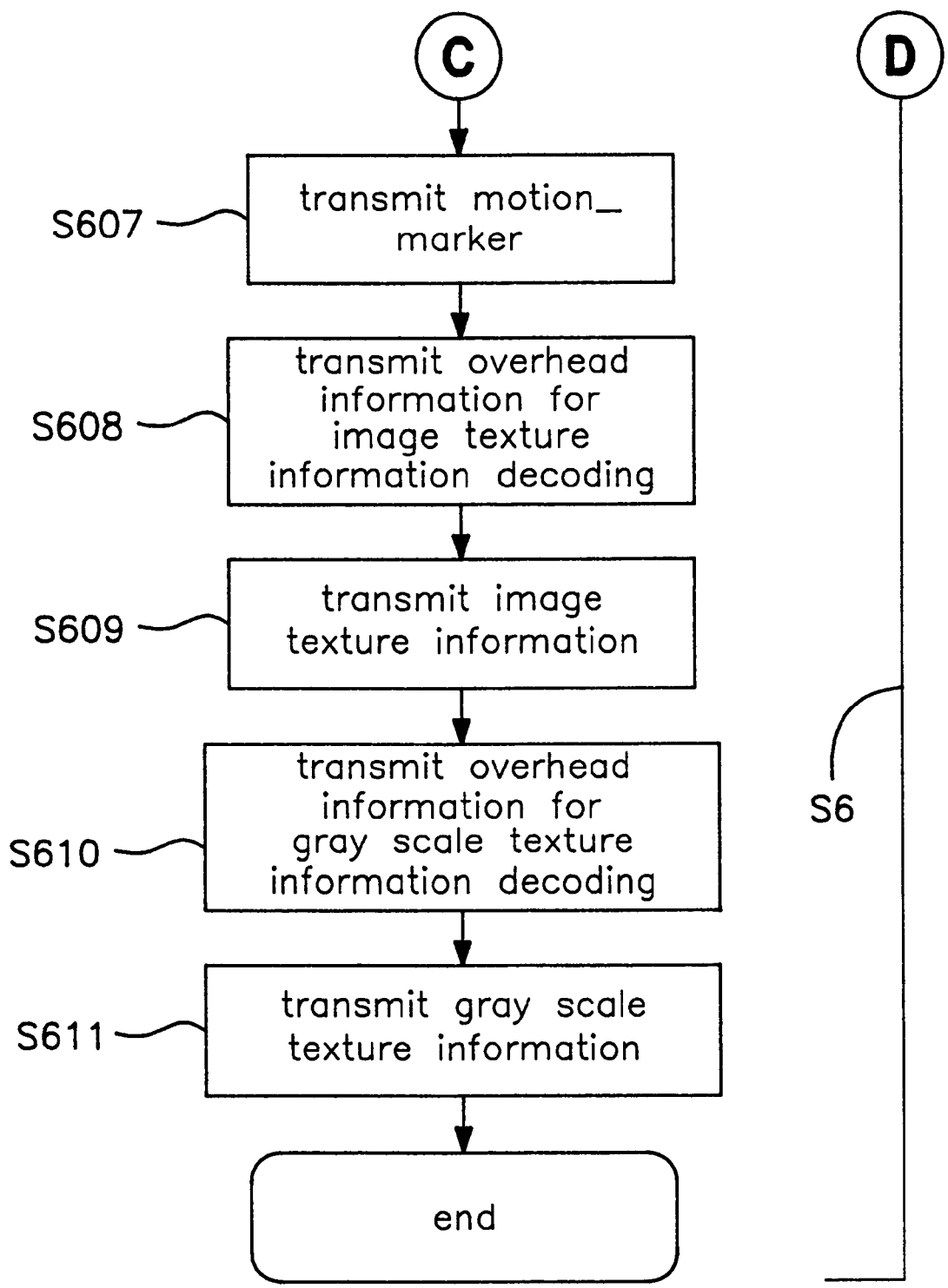

If the given macroblock is determined to be the last macroblock in the video packet at the above step S606, a marker signal, motion_marker, is transmitted at step S607 to make a distinction between motion information and image texture information of all macroblocks in the video packet. It is preferred that the marker signal motion_marker should be distinguished from all possible codes (variable length codes, resynchronization signals and start codes) in a moving video coding system to which the inter picture coding mode of FIG. 17 is applied. For example, in the MPEG-4 standard, a bitstream of "1 1111 0000 0000 0001" may be used as the marker signal motion_marker.

Then, overhead information for the decoding of the image texture information of all the macroblocks in the video packet to be coded is transmitted at step S608. The image texture information, or DC and AC information, of all the macroblocks in the video packet to be coded is transmitted at step S609.

Further, overhead information for the decoding of gray scale texture information of all the macroblocks in the video packet to be coded is transmitted at step S610. Then, the gray scale texture information of all the macroblocks in the video packet to be coded is transmitted at step S611.

The above step S605 of the inter picture video packet coding method in FIG. 17 is the kernel of the present invention. The overhead information for the decoding of the gray scale shape information of the given macroblock is transmitted at the above step S605. Therefore, in the case where the moving video including the gray scale shape information is compression-coded and transmitted, the channel error effect can be minimized and a moving picture of high quality can be reconstructed by the decoder. If the marker signal motion_marker transmitted at step S607 is accurately decoded and the presence of a channel error is detected in the subsequently transmitted image texture information, the coded video packet is reconstructed on the basis of only information preceding the marker signal motion_marker. At this time, the decoder decodes the gray scale texture information using the overhead information for the gray scale shape information transmitted at the above step S605, or the information coda_pb. As stated previously, the information coda_pb indicates the following three cases. Firstly, in the case where the information coda_pb indicates that all gray scale texture information values in the given macroblock are 255, the decoder can reconstruct the given macroblock with those values. Secondly, in the case where the information coda_pb indicates that all the gray scale texture information values in the given macroblock are 0, the decoder can reconstruct the given macroblock using gray scale texture information subjected to motion compensated prediction. Thirdly, in the case where the information coda_pb indicates that all the gray scale texture information values in the given macroblock have been coded, the decoder can reconstruct the given macroblock using gray scale texture information subjected to motion compensated prediction, in the same manner as the second case. Although the second and third cases are performed in the same manner, the second case signifies accurate reconstruction and the third case signifies a degradation in picture quality caused because reconstruction does not reflect image texture information discarded due to a transmission error. However, since the information coda_pa is transmitted separately from gray scale texture information via the marker signal motion_marker, the quality degradation resulting from the transmission error can significantly be improved.

Noticeably, when the information coda_pb indicates a not coded state, or the state where all the gray scale texture information values in the given macroblock are 255 or 0, the gray scale texture information need not be transmitted. This is similarly applied to the above step S610. That is, the overhead information for the gray scale texture information includes the coded block pattern information cpba, as mentioned above. The coded block pattern information cpba indicates whether an AC coefficient to be transmitted is present in each block of each of the macroblocks in the video packet. Accordingly, if the coded block pattern information cpba is transmitted, the AC information need not be transmitted for blocks with no AC coefficient. Upon receiving and decoding the coded block pattern information cpba, the decoder can recognize blocks with no AC coefficient and thus receive and decode AC coefficients with respect to only blocks having them.

Figure 18A:
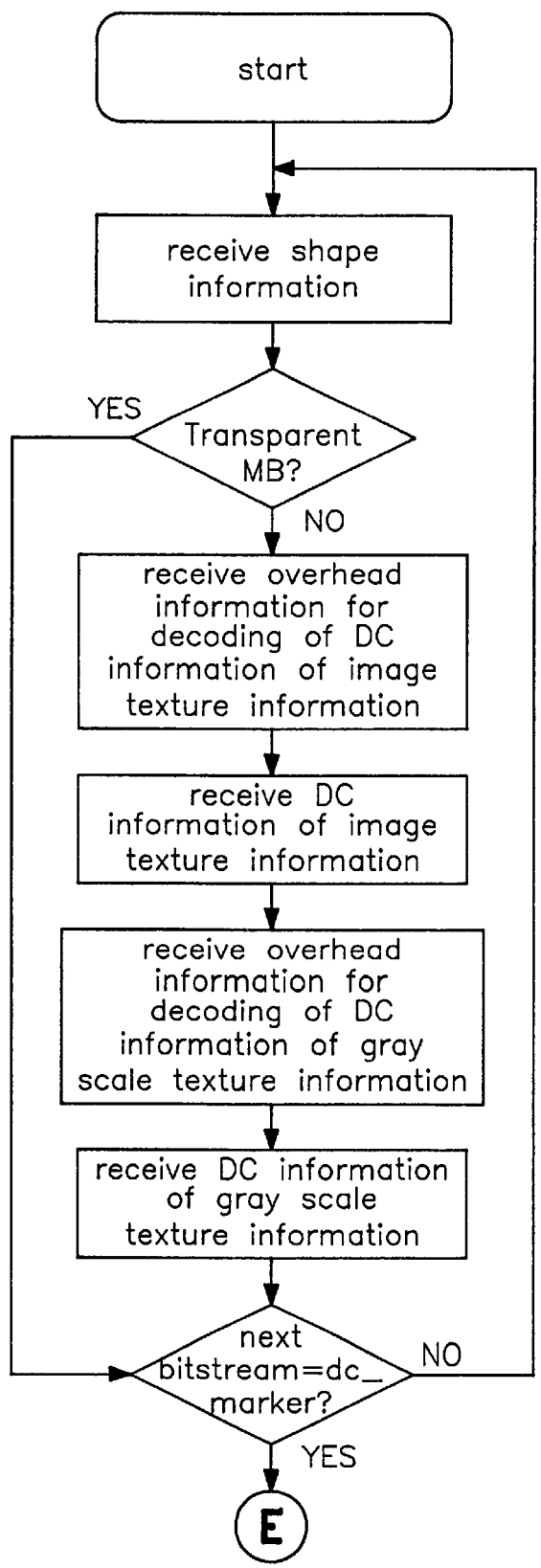
FIGS. 18A and B are a flowchart illustrating a video packet decoding method for the intra picture in accordance with the present invention.
Figure 18B:
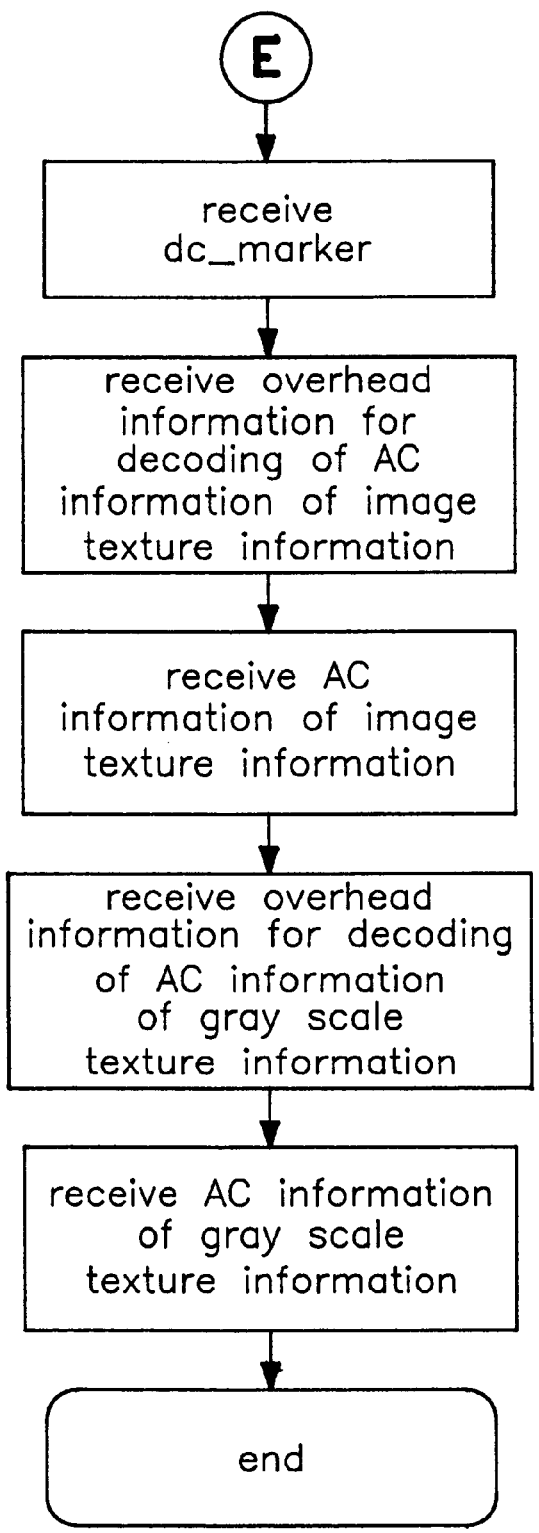
Figure 19A:
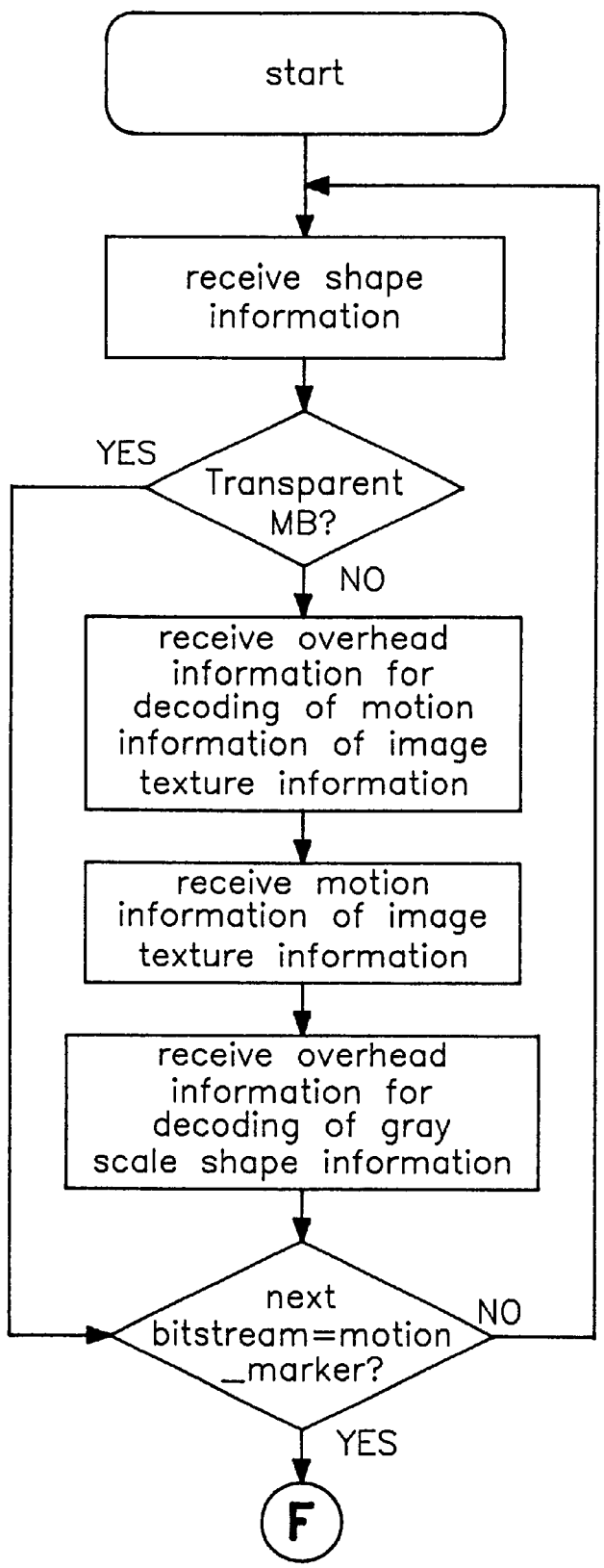
FIGS. 19A and B are a flowchart illustrating a video packet decoding method for the inter picture in accordance with the present invention.
Figure 19B:
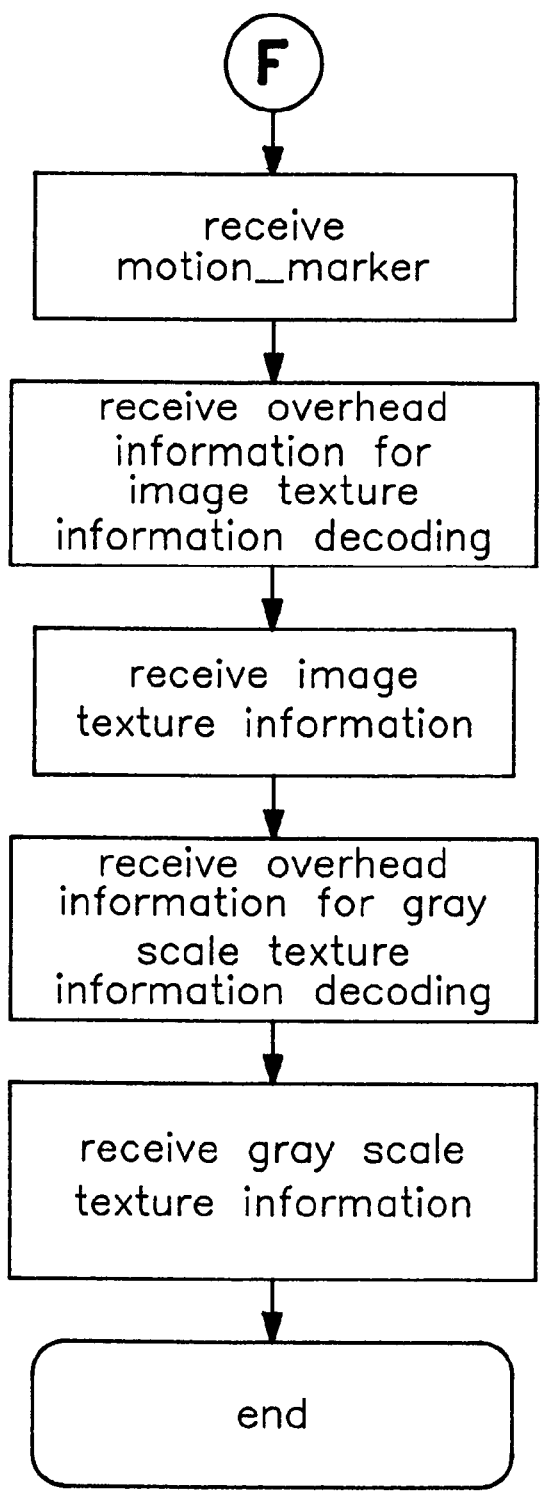

Until now, the video packet coding methods for the intra and inter pictures of the moving video including the gray scale shape information in accordance with the present invention have been described with reference to FIGS. 16 and 17, respectively. FIGS. 16 and 17 show information transmission flows of the coding methods similarly to FIG. 15. FIGS. 18A, 18B ("FIG. 18") and 19A, 19B ("FIG. 19") are flowcharts illustrating video packet decoding methods for the intra and inter pictures of the moving video including the gray scale shape information in accordance with the present invention, respectively. Information transmission flows of FIGS. 18 and 19 are substantially the same as those of FIGS. 16 and 17, respectively, so far as the term "transmit" is substituted with the term "receive". Therefore, a detailed description of the video packet decoding methods will be omitted.

The decoding methods of FIGS. 18 and 19 substantially have the same signal flows as those of the coding methods of FIGS. 16 and 17, respectively, with the exception that they perform control operations somewhat different from those of the coding methods. In the coding methods of FIGS. 16 and 17, the encoder recognizes the length of a given video packet and thus transmits a marker signal dc_marker or motion_marker if the packet length satisfies a specific condition. However, the decoder cannot recognize such a condition and should thus perform the following bitstream checking operation. In more detail, in FIG. 18, upon decoding DC information of gray scale texture information, the decoder first checks whether the next bitstream is the marker signal dc_marker. Then, the decoder receives shape information of the next macroblock if the next bitstream is not the marker signal dc_marker, and the marker signal dc_marker if the next bitstream is the marker signal dc_marker. Similarly, in FIG. 19, upon receiving overhead information for the gray scale texture information, the decoder first checks whether the next bitstream is the marker signal motion_marker. Then, the decoder receives shape information of the next macroblock if the next bitstream is not the marker signal motion_marker, and the marker signal motion_marker if the next bitstream is the marker signal motion_marker.

As apparent from the above description, according to the present invention, the data partitioning coding method is used to code a moving video including gray scale shape information. Then, information of coded video packets is transmitted to the decoder according to a transmission order proposed by the present invention. The decoder receives and decodes the transmitted video packets according to a decoding order proposed by the present invention. Therefore, even when the coded moving video including the gray scale shape information is transmitted through a channel where a transmission error may often occur, the decoder can minimize a degradation in picture quality resulting from the transmission error and thus reconstruct a moving picture of high quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for coding a digital moving video including gray scale shape information, comprising the steps of:
   a) transmitting picture-unit overhead information;
   b) determining whether a video packet to be coded is a first packet of a given picture;
   c) transmitting a video packet header including overhead information for the decoding of said gray scale shape information if it is determined at said step b) that said video packet is not the first packet of the given picture;
   d) determining whether said given picture is an intra picture;
   e) coding and transmitting said video packet in an intra picture mode if it is determined at said step d) that said given picture is the intra picture;
   f) coding and transmitting said video packet in an inter picture mode if it is determined at said step d) that said given picture is not said intra picture; and
   g) determining whether said video packet is a last packet of said given picture, after it is coded and transmitted at said step e) or f), returning to said step b) if said video packet is not the last packet of said given picture and ending a digital moving video coding operation if said video packet is said last packet of said given picture.

2. The method as set forth in claim 1, wherein said picture-unit overhead information at said step a) includes information indicative of whether said given picture is said inter picture or said intra picture, and information indicative of a coding step size of said gray scale shape information.

3. The method as set forth in claim 1, wherein said overhead information for the gray scale shape information decoding at said step c) includes information indicative of whether said given picture is said inter picture or said intra picture, and gray scale texture quantization scale information.

4. The method as set forth in claim 1 or claim 2, wherein said step e) includes the steps of:
   e-1) transmitting shape information of a given macroblock in said video packet;
   e-2) determining whether said given macroblock is a transparent macroblock;
   e-3) transmitting overhead information for the decoding of DC information of image texture information of said given macroblock;
   e-4) transmitting said DC information of said image texture information of said given macroblock;
   e-5) transmitting overhead information for the decoding of DC information of gray scale texture information of said given macroblock;
   e-6) transmitting said DC information of said gray scale texture information of said given macroblock;
   e-7) determining whether said given macroblock is a last macroblock in said video packet and returning to said step e-1) if said given macroblock is not the last macroblock in said video packet;
   e-8) transmitting a marker signal for making a distinction between DC information and AC information of all macroblocks in said video packet if it is determined at said step e-7) that said given macroblock is said last macroblock in said video packet;
   e-9) transmitting overhead information for the decoding of AC information of image texture information of all said macroblocks in said video packet;
   e-10) transmitting said AC information of said image texture information of all said macroblocks in said video packet;
   e-11) transmitting overhead information for the decoding of AC information of gray scale texture information of all said macroblocks in said video packet; and
   e-12) transmitting said AC information of said gray scale texture information of all said macroblocks in said video packet.

5. The method as set forth in claim 4, wherein said overhead information for the DC information decoding at said step e-3) includes macroblock type information and quantization scale information.

6. The method as set forth in claim 4, wherein said overhead information for the DC information decoding at said step e-5) includes information indicative of whether all gray scale texture information values in said given macroblock are 255.

7. The method as set forth in claim 4, wherein said step e-7) includes the step of determining whether said given macroblock is said last macroblock in said video packet, on the basis of the fact that the length of said video packet is set to a predetermined number of macroblocks or said video packet is determined to be ended if the number of bits accumulated in said video packet exceeds a predetermined threshold value.

8. The method as set forth in claim 4, wherein said overhead information for the AC information decoding at said step e-9) includes information indicative of whether an AC coefficient to be transmitted is present in each block of each of said macroblocks in said video packet, and information indicative of whether said AC information has been predictive-coded.

9. The method as set forth in claim 1 or claim 2, wherein said step f) includes the steps of:

f-1) transmitting shape information of a given macroblock in said video packet;

f-2) determining whether said given macroblock is a transparent macroblock;

f-3) transmitting overhead information for the decoding of motion information of image texture information of said given macroblock;

f-4) transmitting said motion information of said image texture information of said given macroblock;

f-5) transmitting. overhead information for the decoding of gray scale shape information of said given macroblock;

f-6) determining whether said given macroblock is a last macroblock in said video packet and returning to said step f-1) if said given macroblock is not the last macroblock in said video packet;

f-7) transmitting a marker signal for making a distinction between motion information and image texture information of all macroblocks in said video packet if it is determined at said step f-6) that said given macroblock is said last macroblock in said video packet;

f-8) transmitting overhead information for the decoding of said image texture information of all said macroblocks in said video packet;

f-9) transmitting said image texture information of all said macroblocks in said video packet;

f-10) transmitting overhead information for the decoding of gray scale texture information of all said macroblocks in said video packet; and f-11) transmitting said gray scale texture information of all said macroblocks in said video packet.

10. The method as set forth in claim 9, wherein said overhead information for the motion information decoding at said step f-3) includes information indicative of whether information to be transmitted is present in said given macroblock, macroblock type information indicative of whether said given macroblock is an intra macroblock or an inter macroblock, and quantization scale information.

11. The method as set forth in claim 9, wherein said overhead information for the gray scale shape information decoding at said step f-5) includes information for making a distinction between the case where all gray scale texture information values in said given macroblock are 255 or not and the case where all the gray scale texture information values in said given macroblock are 0 or not.

12. The method as set forth in claim 9, wherein said step f-6) includes the step of determining whether said given macroblock is said last macroblock in said video packet, on the basis of the fact that the length of said video packet is set to a predetermined number of macroblocks or said video packet is determined to be ended if the number of bits accumulated in said video packet exceeds a predetermined threshold value.

* * * * *